(12) United States Patent
Usuginu

(10) Patent No.: US 9,975,638 B2
(45) Date of Patent: May 22, 2018

(54) CRADLE DEVICE, CRADLE SET, AND TERMINAL DEVICE

(71) Applicant: Panasonic Intellectual Property Management Co., Ltd., Osaka (JP)

(72) Inventor: Yutaro Usuginu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/079,932

(22) Filed: Mar. 24, 2016

(65) Prior Publication Data

US 2016/0286676 A1    Sep. 29, 2016

(30) Foreign Application Priority Data

Mar. 26, 2015 (JP) ................................ 2015-063622
Nov. 19, 2015 (JP) ................................ 2015-226164

(51) Int. Cl.
| H05K 7/02 | (2006.01) |
| B64D 11/00 | (2006.01) |
| H04M 1/06 | (2006.01) |
| H04B 1/3877 | (2015.01) |
| H04M 1/04 | (2006.01) |

(52) U.S. Cl.
CPC ...... B64D 11/00155 (2014.12); *H04B 1/3877* (2013.01); *H04M 1/04* (2013.01); *H04M 1/06* (2013.01)

(58) Field of Classification Search
CPC ........ H04B 1/3877; H04M 1/04; H04M 1/06; B64D 11/00155

USPC ......................................................... 361/807
See application file for complete search history.

(56) References Cited

U.S. PATENT DOCUMENTS

| 4,609,790 A | 9/1986 | Kaiwa et al. |
| 4,700,383 A | 10/1987 | Takagi et al. |
| 5,737,808 A | 4/1998 | Ikeda |
| 5,832,082 A * | 11/1998 | Nagai ................. B60R 11/0241 |
| | | 379/426 |
| 6,353,536 B1 | 3/2002 | Nakamura et al. |

(Continued)

FOREIGN PATENT DOCUMENTS

| JP | 59-072062 U | 5/1984 |
| JP | 61-030851 A | 2/1986 |

(Continued)

*Primary Examiner* — James Wu
(74) *Attorney, Agent, or Firm* — McDermott Will & Emery LLP

(57) ABSTRACT

A cradle device is configured to removably store a terminal device provided with a first recess having a second recess on its inner side face, the second recess being dented in a direction intersecting a removable direction. This cradle device includes a third recess, a pusher, and a locker. The third recess is capable of storing at least a part of the terminal device, the part including the first recess. The pusher is brought into contact with the first recess of the terminal device stored in the third recess, thereby pushing up the terminal device from the third recess. The locker is disposed in combination with the pusher and has a projection part formed to be engageable with the second recess. The locker holds the terminal device in such a manner that the projection part is engaged with the second recess of the terminal device pushed up by the pusher.

8 Claims, 17 Drawing Sheets

(56) References Cited

U.S. PATENT DOCUMENTS

| | | | | |
|---|---|---|---|---|
| 6,751,486 B1* | 6/2004 | Guillot | ................ | H02J 7/0042 |
| | | | | 379/322 |
| 2003/0068986 A1* | 4/2003 | Oh | ..................... | B60R 11/0241 |
| | | | | 455/90.1 |

FOREIGN PATENT DOCUMENTS

| JP | H09-238716 A | 9/1997 |
|---|---|---|
| JP | 2000-029559 A | 1/2000 |
| JP | 2003-069682 A | 3/2003 |

* cited by examiner

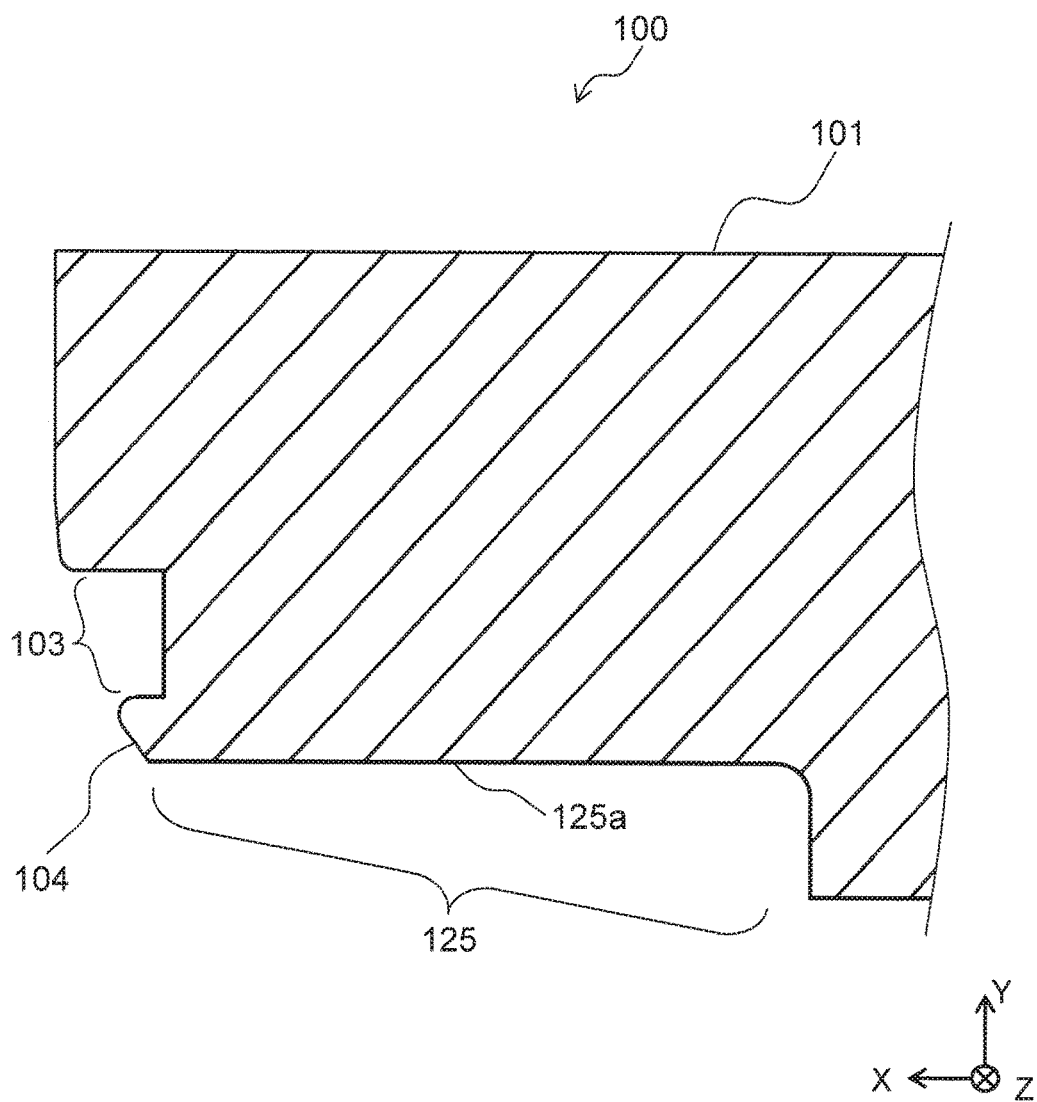

FIG. 4
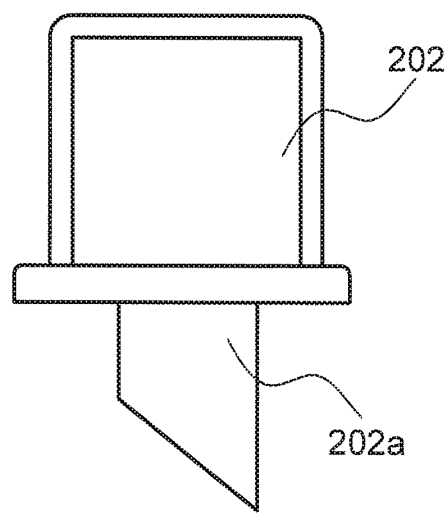
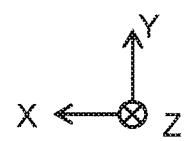

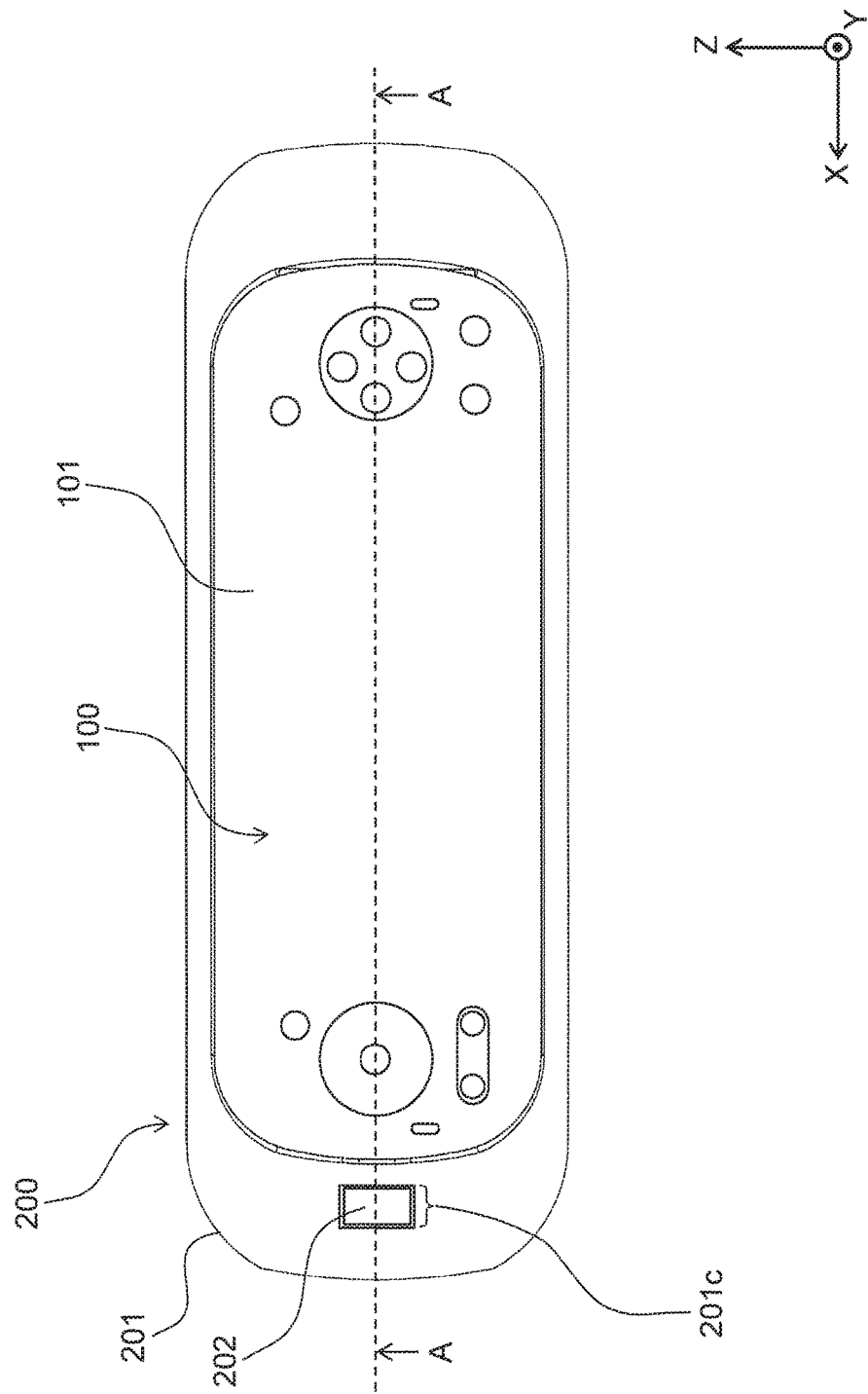

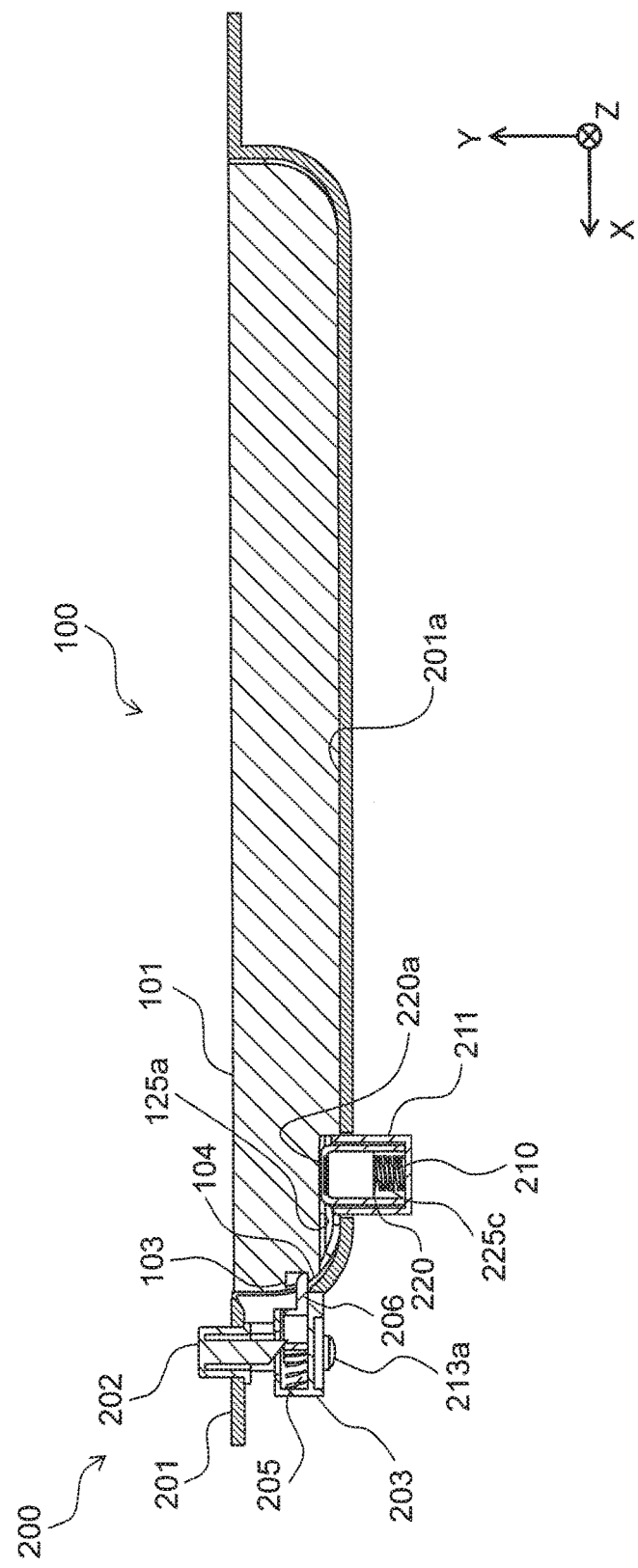

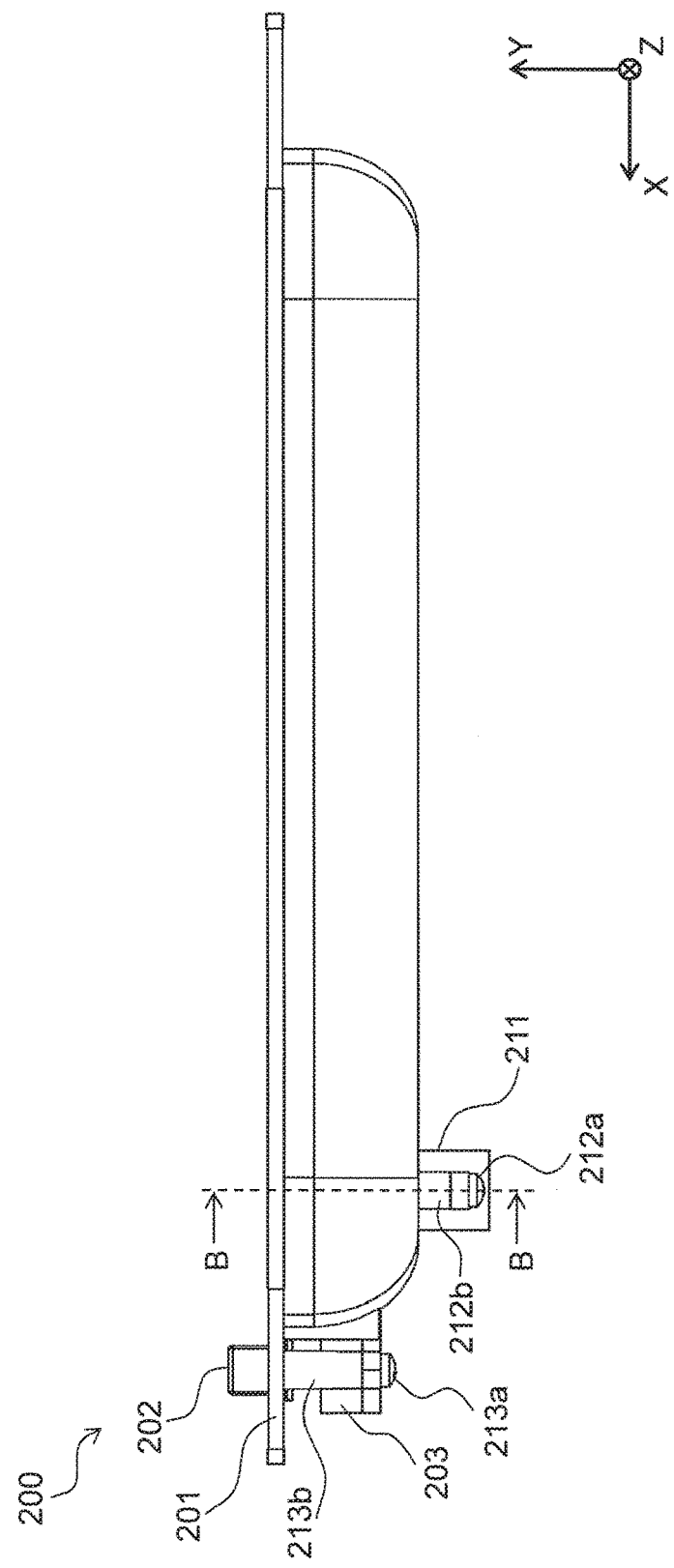

FIG. 9
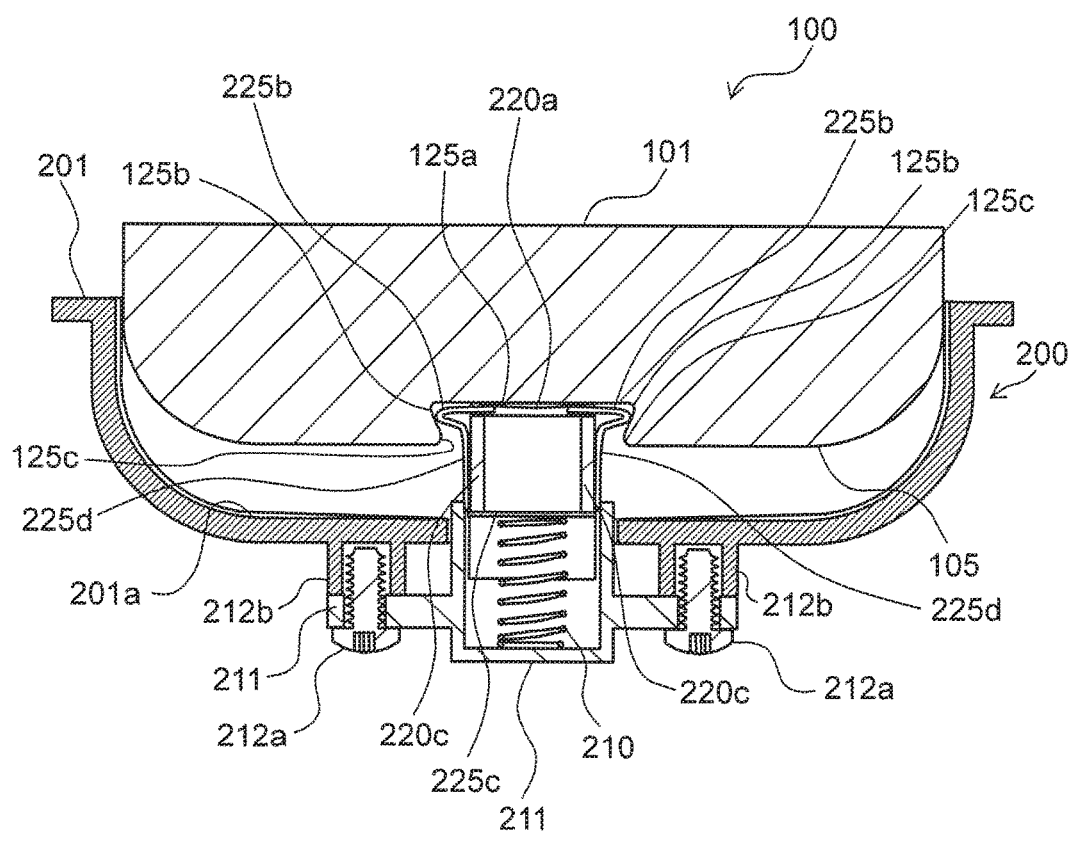
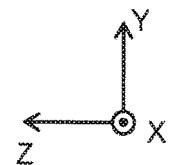

CRADLE DEVICE, CRADLE SET, AND TERMINAL DEVICE

RELATED APPLICATIONS

This application claims the benefit of priority of Japanese Application No. 2015-063622, filed on Mar. 26, 2015, and Japanese Application No. 2015-226164, filed on Nov. 19, 2015, the disclosures of which are incorporated by reference herein.

BACKGROUND

1. Field of the Disclosure

The present disclosure relates to a cradle device that removably holds a terminal device.

2. Background Art

Unexamined Japanese Patent Publication No. 2003-69682 (PTL 1) discloses a cradle device that removably holds a handset. With this cradle device, when a user removes the handset from the cradle device, the handset is changed into a state of being popped up from the cradle device from a state of being stored in the cradle device. Accordingly, the user can easily remove the handset from the cradle device.

SUMMARY

The present disclosure provides a cradle device that removably holds a terminal device and can prevent the terminal device from falling when a user removes the terminal device.

The cradle device according to the present disclosure removably stores a terminal device provided with a first recess having a second recess on its inner side face, the second recess being dented in a direction intersecting the removable direction. This cradle device includes a third recess, a pusher, and a locker. The third recess is capable of storing at least a part of the terminal device, the part including the first recess. The pusher is brought into contact with the first recess of the terminal device stored in the third recess, thereby pushing up the terminal device from the third recess. The locker is disposed in combination with the pusher and as a projection part formed to be engageable with the second recess. The locker holds the terminal device in such a manner that the projection part is engaged with the second recess of the terminal device pushed up by the pusher.

A cradle set according to the present disclosure includes a terminal device provided with a first recess having a second recess on its inner side face, and a cradle device removably storing the terminal device, the second recess being dented in a direction intersecting the removable direction. This cradle device includes a third recess, a pusher, and a locker. The third recess is capable of storing at least a part of the terminal device, the part including the first recess. The pusher is brought into contact with the first recess of the terminal device stored in the third recess, thereby pushing up the terminal device from the third recess. The locker is disposed in combination with the pusher and has a projection part formed to be engageable with the second recess. The locker holds the terminal device in such a manner that the projection part is engaged with the second recess of the terminal, device pushed up by the pusher.

The terminal device according to the present disclosure is the terminal device used in combination with the above cradle device. This terminal device includes a first recess. The first recess includes a face opposite to a bottom surface of the third recess when the terminal device is stored in the third recess of the cradle device, and a second recess dented in a direction intersecting the removable direction of the terminal device relative to the cradle device.

The cradle device according to the present disclosure is effective to prevent the terminal device from falling, when the user removes the terminal device.

BRIEF DESCRIPTION OF DRAWINGS

FIG. 3C is a partial sectional view schematically illustrating a part of the handset according to the first exemplary embodiment as being enlarged;

FIG. 4 is a side view schematically illustrating one example of a button according to the first exemplary embodiment;

FIG. 6A is a plan view schematically illustrating one example of a state in which the handset is stored in the cradle according to the first exemplary embodiment;

FIG. 6B is a sectional view schematically illustrating one example of a state in which the handset is stored in the cradle according to the first exemplary embodiment;

FIG. 7A is a side view schematically illustrating one example of a state in which the handset is stored in the cradle according to the first exemplary embodiment;

FIG. 9 is a sectional view schematically illustrating one example of a state in which the handset is popped up from the cradle according to the first exemplary embodiment;

DETAILED DESCRIPTION

Figure 1:
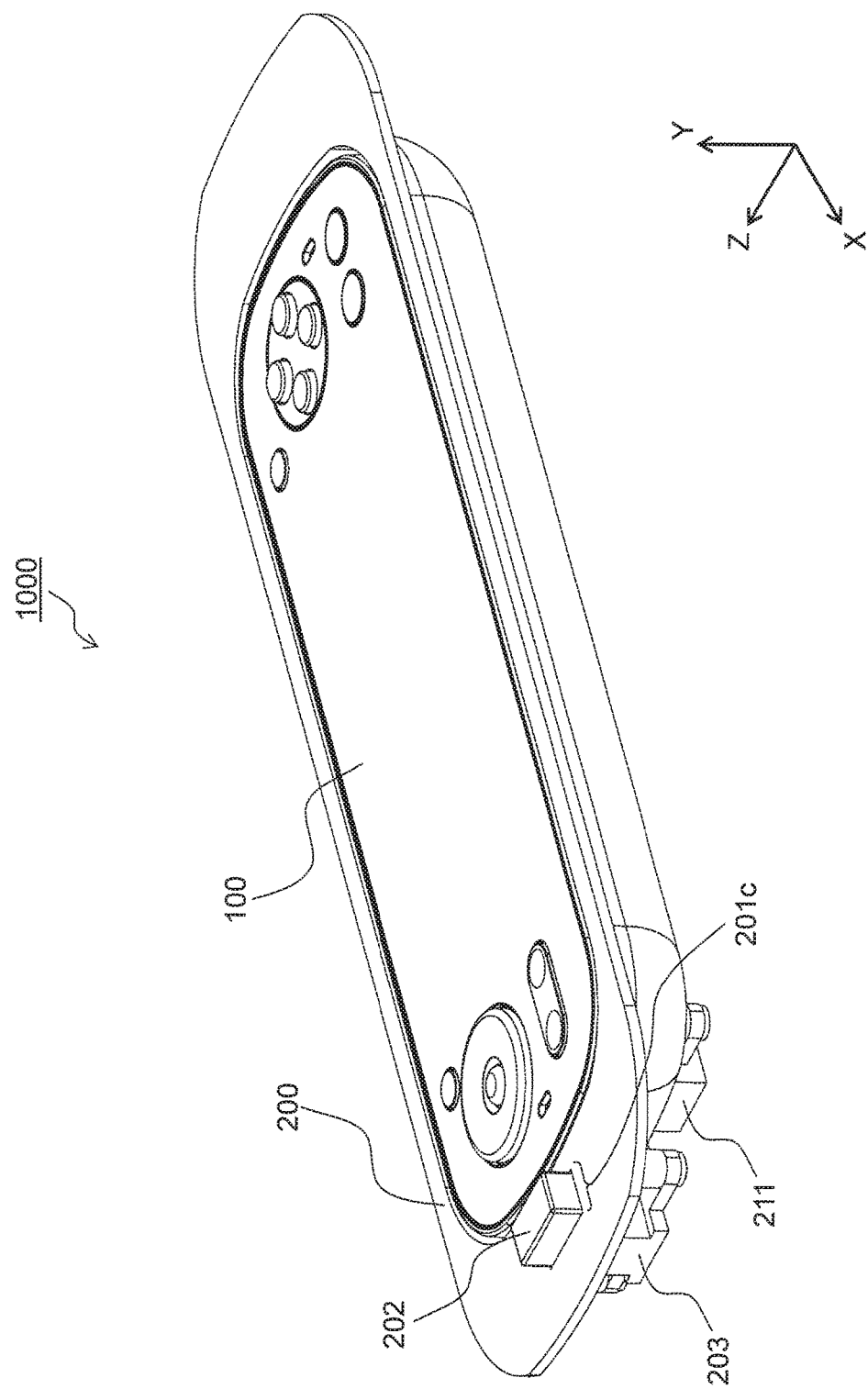
FIG. 1 is a perspective view schematically illustrating one example of an appearance of a cradle storing a handset according to a first exemplary embodiment.

Hereinafter, exemplary embodiments will be described in detail with reference to the accompanying drawings as necessary. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

Unless otherwise specified, reference numerals, symbols, and numbers that are the same in the description indicate the same constituent elements. Also, unless otherwise specified, constituent elements that are not essential to the present disclosure are not depicted.

First Exemplary Embodiment

A first exemplary embodiment will be described below with reference to FIGS. 1 to 13. In the first exemplary embodiment, pop-up cradle 200 is described. In the present disclosure, the state in which a part of handset 100 stored in cradle 200 pops up from cradle 200, for example, when being removed by a user is called "pop up".

[1-1. Configuration]

FIG. 1 is a perspective view schematically illustrating one example of an appearance of cradle 200 storing handset 100 according to the first exemplary embodiment.

Cradle set 1000 includes handset 100 and cradle 200. Cradle 200 can removably store handset 100. Cradle set 1000 is one example of a cradle set, cradle 200 is one example of a cradle device, and handset 100 is one example of a terminal device.

Handset 100 is an operation terminal of a computer, for example. Handset 100 is a popularly known operation terminal, so that the detailed description relating to its function will be omitted.

In the present exemplary embodiment, handset 100 may have a function as an operation terminal of a server computer mounted to an aircraft, for example, and cradle 200 storing handset 100 may be installed in a seat of an aircraft. In this exemplary configuration, passengers in an aircraft are able to use various services provided in the aircraft by removing handset 100 from cradle 200 and operating handset 100. The person operating handset 100 is referred to as a "user" below.

Note that this configuration is merely one embodiment. Handset 100 is not particularly limited to an operation terminal of a computer, and the place where cradle 200 is installed is not particularly limited to a seat of an aircraft. Cradle 200 may be installed in a seat prepared in a movable body such as a bus, a rail car, a watercraft, or the like, or in a public place such as a movie theater, a stage theater, or the like. Cradle 200 may be installed in a place other than a seat. Handset 100 may have a verbal communication function, a communication function, or a computation function, and also may have a display device. Alternatively, it may be configured that a display device installed in a seat operates in cooperation with handset 100.

Next, structures of handset 100 and cradle 200 will be described.

XYZ axes will be used below for the sake of convenience of the description for each drawing. In the present exemplary embodiment, a longitudinal direction of cradle 200 is specified as an X axis, and an installing direction of button 202 (see FIG. 2) with respect to projections 201b (see FIG. 2) is specified as a positive direction of the X axis. A removal direction of cradle 200 from handset 100 is specified as a Y axis, and a direction in which handset 100 is removed from cradle 200 is specified as a positive direction of the Y axis. A direction perpendicular to the X axis and Y axis is specified as a Z axis, wherein the direction of the Z axis with the positive direction of the X axis specified as the left side and the negative direction in the X axis specified as the right side is specified as a positive direction of the Z axis. It is supposed that the XYZ axes used for the description of handset 100 indicate XYZ axes in the case where handset 100 is stored in cradle 200. A side of cradle 200 (or handset 100) viewed from the positive direction toward the negative direction of the X axis is specified as a front of cradle 200 (or handset 100), and a side of cradle 200 (or handset 100) viewed from the negative direction toward the positive direction of the Z axis is specified as a side face (right side face) of cradle 200 (or handset 100).

Figure 2:
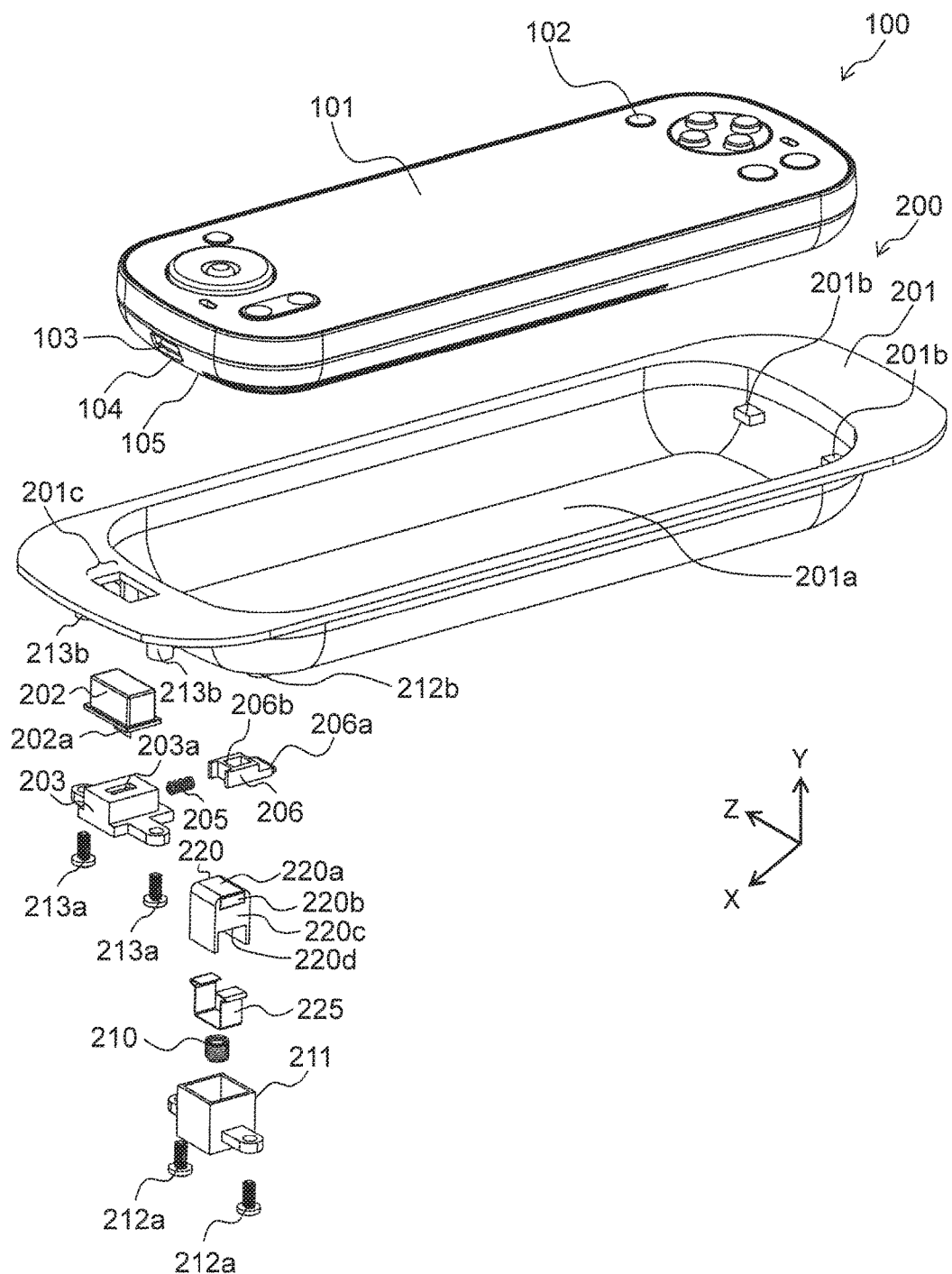
FIG. 2 is an exploded perspective view schematically illustrating one example of an exemplary configuration of the cradle according to the first exemplary embodiment.

FIG. 2 is an exploded perspective view schematically illustrating one example of an exemplary configuration of cradle 200 according to the first exemplary embodiment. FIG. 2 also illustrates one example of an appearance of handset 100.

Figure 3A:
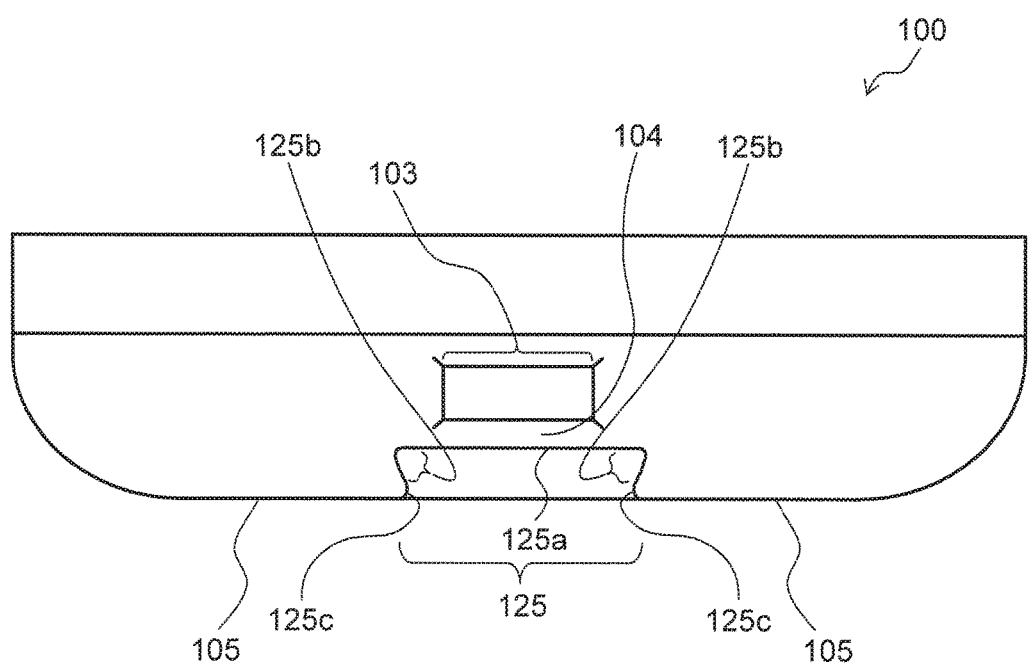
FIG. 3A is a front view schematically illustrating one example of a handset according to the first exemplary embodiment.
Figure 3B:
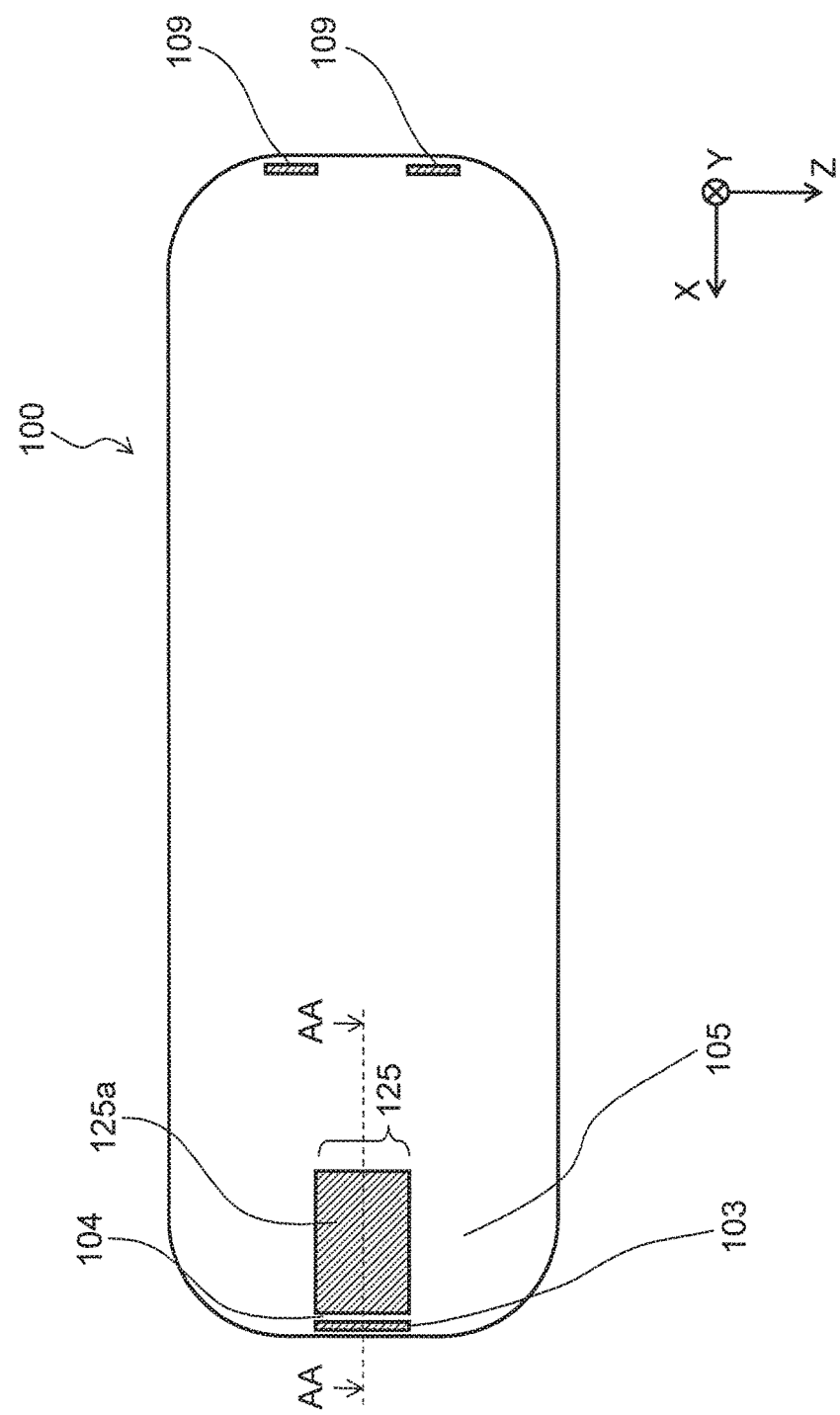
FIG. 3B is a bottom view schematically illustrating one example of the handset according to the first exemplary embodiment.

FIG. 3A is a front view schematically illustrating one example of handset 100 according to the first exemplary embodiment. FIG. 3B is a bottom view schematically illustrating one example of handset 100 according to the first exemplary embodiment. FIGS. 3A and 3B are each a view of handset 100 viewed from a front and a bottom surface for schematically illustrating shapes and formation positions of recess 103 and recess 125 formed on handset 100. Sides at the bottom surface of handset 100 are shorter than sides on the top surface (the surface on which buttons 102 are provided) as viewed from the side face, so that the formation positions of recess 103 and recesses 109 can schematically be illustrated in FIG. 3B.

FIG. 3C is a partial sectional view schematically illustrating a part of handset 100 according to the first exemplary embodiment as being enlarged. FIG. 3C is a partial sectional view (a partial sectional view along line AA-AA in FIG. 3B) viewed from the side face of handset 100 for schematically illustrating shapes of recess 103 and recess 125 formed on handset 100. FIG. 3C illustrates only an outline of handset 100.

Firstly, handset 100 will be described.

Handset 100 includes body 101 and a plurality of buttons 102 used by a user operating handset 100. Body 101 includes recess 103, face 104, bottom surface 105, and recess 125. Recess 103 is one example of a fourth recess of the terminal device, and recess 125 is one example of a first recess.

As illustrated in FIGS. 2 and 3A, recess 103 is formed to be dented in the negative direction of the X axis on an end surface (front surface) of handset 100 in the longitudinal direction (positive direction in the X axis).

As illustrated in FIGS. 3A and 3B, recess 125 is formed to be dented in the positive direction of the Y axis on bottom surface 105 in the vicinity of recess 103 of handset 100 (in other words, on bottom surface 105 in the vicinity of the front surface of handset 100).

Recess 125 has face 125a and a pair of recesses 125b, face 125a being formed to be substantially parallel to a bottom surface of storage portion 201a when handset 100 is stored in storage portion 201a of cradle 200. Recess 125b is one example of a second recess. Face 125a faces the bottom surface of storage portion 201a of cradle 200 when handset 100 is stored in storage portion 201a of cradle 200.

As illustrated in FIG. 3A showing one example, a pair of recesses 125b is formed in recess 125. One of recesses 125b is formed on one side face (side face in the positive direction of the Z axis) in recess 125 in the vicinity of the boundary with face 125a so as to be dented in the positive direction of the Z axis, and the other is formed on the other side face (side face in the negative direction of the Z axis) in recess 125 in the vicinity of the boundary with face 125a so as to be dented in the negative direction of the Z axis. Specifically recesses 125b are formed such that the side faces in recess 125 are not formed to be parallel to the Y axis but formed to have an angle relative to the Y axis (formed to be dented in the positive direction of the Z axis and the negative direction of the Z axis respectively). As described above, recess 125 has a pair of recesses 125b on its inner side face, the pair of recesses 125b being formed to be dented in the direction intersecting the removal direction of handset 100 with respect to cradle 200.

Notably, boundary positions 125c between recess 125 and bottom surface 105 may be formed into a rounded shape as illustrated in FIG. 3A showing one example. Note that boundary position 125c includes a region around the boundary between recess 125 and bottom surface 105.

As illustrated in FIGS. 3A to 3C, face 104 is formed between recess 103 and recess 125. A gentle curved face illustrated in FIG. 3C may be formed between recess 103 and surface 104, for example.

Handset 100 is also provided with a pair of recesses 109 (see FIG. 3B) formed to be dented in the positive direction of the X axis so as to be fitted to projections 201b of cradle 200, the pair of recesses 109 being formed on the face (end face of handset 100 in the longitudinal direction (in the negative direction of the X axis) of handset 100, and hereinafter referred to as a back face) opposite to the front face on which recess 103 is formed. Note that the number of recesses 109 is not limited to two.

Next, cradle 200 will be described.

As illustrated in FIG. 2, cradle 200 includes body 201, button 202, cover 203, spring 205, locking claw 206, spring 210, base 211, screw 212a, boss 212b, screw 213a, boss 213b, pusher 220, and plate spring 225. Locking claw 206 is one example of a locking claw, plate spring 225 is one example of a locker, pusher 220 is one example of a pusher, spring 210 is one example of a pushing spring, and base 211 is one example of a holder.

Body 201 includes storage portion 201a capable of storing handset 100 and a pair of projections 201b. Storage portion 201a is one example of a third recess. Note that the number of projections 201b is not limited to two.

Storage portion 201a is formed to be capable of storing a part or all of handset 100 including bottom surface 105, face 104, recess 103, and recess 125.

Projections 201b are formed on the side face (the face opposite to the back face of handset 100 stored in storage portion 201a) at the leading end of storage portion 201a in the longitudinal direction (in the negative direction of the X axis), and formed into a shape having a project in the positive direction of the X axis so as to be fitted to recesses 109 formed on the back face of handset 100. Accordingly at a time when handset 100 is to be stored in storage portion 201a, projections 201b are fitted to recesses 109 of handset 100. As described below, when handset 100 is stored in storage portion 201a of cradle 200, locking claw 206 is engaged with recess 103 of handset 100. With this, handset 100 is stored in storage portion 201a as being held by projections 201b and locking claw 206.

Body 201 has a button hole 201c at the side opposite to projections 201b (i.e., near recess 103 of handset 100 stored in storage portion 201a). Button hole 201c is formed such that button 202 projects therethrough.

FIG. 1 illustrates button 202 provided through button hole 201c. As illustrated in FIG. 1, button 202 is provided to be inserted into button hole 201c from the negative direction toward the positive direction of the Y axis so as to project from button hole 201c. It is configured so that a user can push button 202, which projects from button hole 201c, in the negative direction of the Y axis. In the present exemplary embodiment, a position of button 202 projecting from button hole 201c (see FIGS. 1, 6B, and 7A) is specified as a "first position", and a position of button 202 pressed by a user in the negative direction of the Y axis (see FIG. 8) is specified as a "second position". As described above, button 202 mounted through button hole 201c is configured to be movable between the first position and the second position located in the negative direction of the Y axis from the first position.

A structure around button 202 will next be described.

FIG. 4 is a side view schematically illustrating one example of button 202 according to the first exemplary embodiment.

Button 202 includes claw 202a. Claw 202a is formed to project from the bottom surface of button 202 in the negative direction of the Y axis, and has a slope in the positive direction of the X axis.

As illustrated in FIG. 2, locking claw 206 includes claw tip 206a and pressed part 206b.

Cover 203 is a member to restrict the moving direction of locking claw 206. Cover 203 is fixed to body 201 of cradle 200 by way that screws 213a are threaded to bosses 213b formed near button hole 201c on cradle 200. Cover 203 also has hole 203a through which claw 202a of button 202 is inserted. Locking claw 206 is provided in combination with cover 203. Locking claw 206 is movable in only the X axis direction, because the moving direction of locking claw 206 is restricted by cover 203. Locking claw 206 is configured to move in conjunction with button 202. In the present exemplary embodiment, a position of locking claw 206 where button 202 is located at the first position is specified as a "third position" (see FIG. 6B), and a position of locking claw 206 where button 202 is located at the second position is specified as a "fourth position" (see FIG. 8). The fourth position is located in the positive direction of the X axis from the third position. As described above, locking claw 206 is configured to be movable between the third position and the fourth position in conjunction with button 202.

Specifically, locking claw 206 is biased in the negative direction of the X axis (in the direction toward the third position from the fourth position) relative to cover 203 with spring 205 which has one end in contact with cover 203 fixed to body 201 of cradle 200 and the other end in contact with locking claw 206. On the other hand, claw 202a of button 202 is in contact with pressed part 206b of locking claw 206 through hole 203a of cover 203, and as illustrated in FIG. 4, a tip of claw 202a is formed into a shape having a slope in the positive direction of the X axis so as to press pressed part 206b relative to cover 203 in the positive direction the X axis when button 202 is pushed in the negative direction of the Y axis.

With this, when a user does not apply force for pushing button 202, locking claw 206 is held at the third position by spring 205, and claw 202a of button 202 is pushed up in the positive direction of the Y axis by pressed part 206b of locking claw 206, so that button 202 is held at the first position. On the other hand, when button 202 is pressed by the user to be moved from the first position to the second position, claw 202a of button 202 presses pressed part 206b of locking claw 206 in the positive direction of the X axis, so that locking claw 206 moves to the fourth position from the third position.

Notably, spring 205 biases locking claw 206 located at the fourth position toward the third position (in the negative direction of the X axis). Therefore, when the application of force for pushing button 202 is stopped (when the user stops the operation of pushing button 202), locking claw 206 moves to the third position from the fourth position, and in conjunction with this movement, button 202 returns to the first position from the second position.

Claw tip 206a of locking claw 206 is formed into a shape engageable with recess 103 of handset 100. Locking claw 206 located at the third position holds handset 100 in storage portion 201a to prevent handset 100 from falling from storage portion 201a with the engagement between recess 103 of handset 100 stored in storage portion 201a of cradle 200 and claw tip 206a (see FIG. 6B). When button 202 is pushed by the user to be moved from the first position to the second position, and locking claw 206 moves from the third position to the fourth position, recess 103 on handset 100 is released from the engagement with claw tip 206a, so that handset 100 is popped up from storage portion 201a (see FIG. 8). This operation will be described below in detail.

The relationship between pusher 220 and plate spring 225 will be described next. In the description below, it is supposed that handset 100 stored in storage portion 201a of cradle 200 is held in storage portion 201a with the state in which locking claw 206 and recess 103 of handset 100 are engaged with each other as described above.

Pusher 220 includes face 220a, holes 220b, faces 220c, and face 220d.

Face 220d is a face formed on a side being opposite to face 220a, and it is on an inner side in the perspective view in FIG. 2. Therefore, a reference numeral is only provided. Pusher 220 may have a face serving as face 220d, or an end of face 220c may be used as face 220d.

Face 220a is formed on an upper part (in the positive direction of the Y axis) of pusher 220 to have a shape capable of being in contact with face 125a of recess 125 on handset 100. As schematically illustrated in FIG. 2, pusher 220 is configured to be capable of being combined with plate spring 225 disposed below pusher 220 (in the negative direction of the Y axis). Face 220d of pusher 220 is formed into a shape capable of being in contact with face 225c (see FIG. 5) of plate spring 225. Holes 220b are formed into a shape capable of storing faces 225a (see FIG. 5) of plate spring 225.

Pusher 220 is configured to be movable between a fifth position and a sixth position. In the present exemplary embodiment, a position of pusher 220 where handset 100 is stored in storage portion 201a is specified as the "fifth position" (see FIGS. 6B and 7B). A position of pusher 220 where handset 100 is popped up from storage portion 201a or where handset 100 is removed from storage portion 201a is specified as the "sixth position" (see FIGS. 8 to 13). The sixth position is located in the positive direction of the Y axis from the fifth position. The fifth position is one example of a storage position, and the sixth position is one example of a pushing up position.

The sixth position (see FIGS. 12 and 13) where handset 100 is removed from storage portion 201a may be located in the positive direction of the Y axis from the sixth position (see FIGS. 8 and 9) where handset 100 is popped up from storage portion 201a.

When handset 100 is stored in storage portion 201a of cradle 200 and pusher 220 is located at the fifth position, face 220a of pusher 220 is brought into contact with face 125a of recess 125 on handset 100. With this, the movable range of pusher 220 is restricted, and pusher 220 is held at the fifth position.

Spring 210 is provided between plate spring 225 combined to pusher 220 and base 211. One end of spring 210 is in contact with base 211 and the other end is in contact with the back surface (surface at the back of the surface with which face 220d of pusher 220 is in contact. See FIG. 5) of face 225c of plate spring 225. Pusher 220 is biased in the positive direction of the Y axis (the direction from the fifth position toward the sixth position) relative to base 211 by spring 210 through plate spring 225. Therefore, when handset 100 is popped up from storage portion 201a of cradle 200 or when handset 100 is removed from storage portion 201a of cradle 200, pusher 220 is held at the sixth position by spring 210.

When button 202 is pushed by the user to be moved from the first position to the second position in the case where handset 100 is stored in storage portion 201a of cradle 200, locking claw 206 moves from the third position to the fourth position, so that the engagement between recess 103 of handset 100 and locking claw 206 is released. With this, handset 100 is in the state capable of being popped up from storage portion 201a, and pusher 220 is released from the restriction for the movable range. Thus, pusher 220 is biased by spring 210 to be moved from the fifth position to the sixth position, and face 220a of pusher 220 presses face 125a of handset 100 to push up handset 100 in the positive direction of the Y axis. In this way, handset 100 is popped up from storage portion 201a (see FIGS. 8 and 9).

Base 211 is fixed to body 201 of cradle 200 by way that screws 212a are threaded to bosses 212b formed on the back surface (surface opposite to the surface on which handset 100 is stored) of cradle 200.

Figure 5:
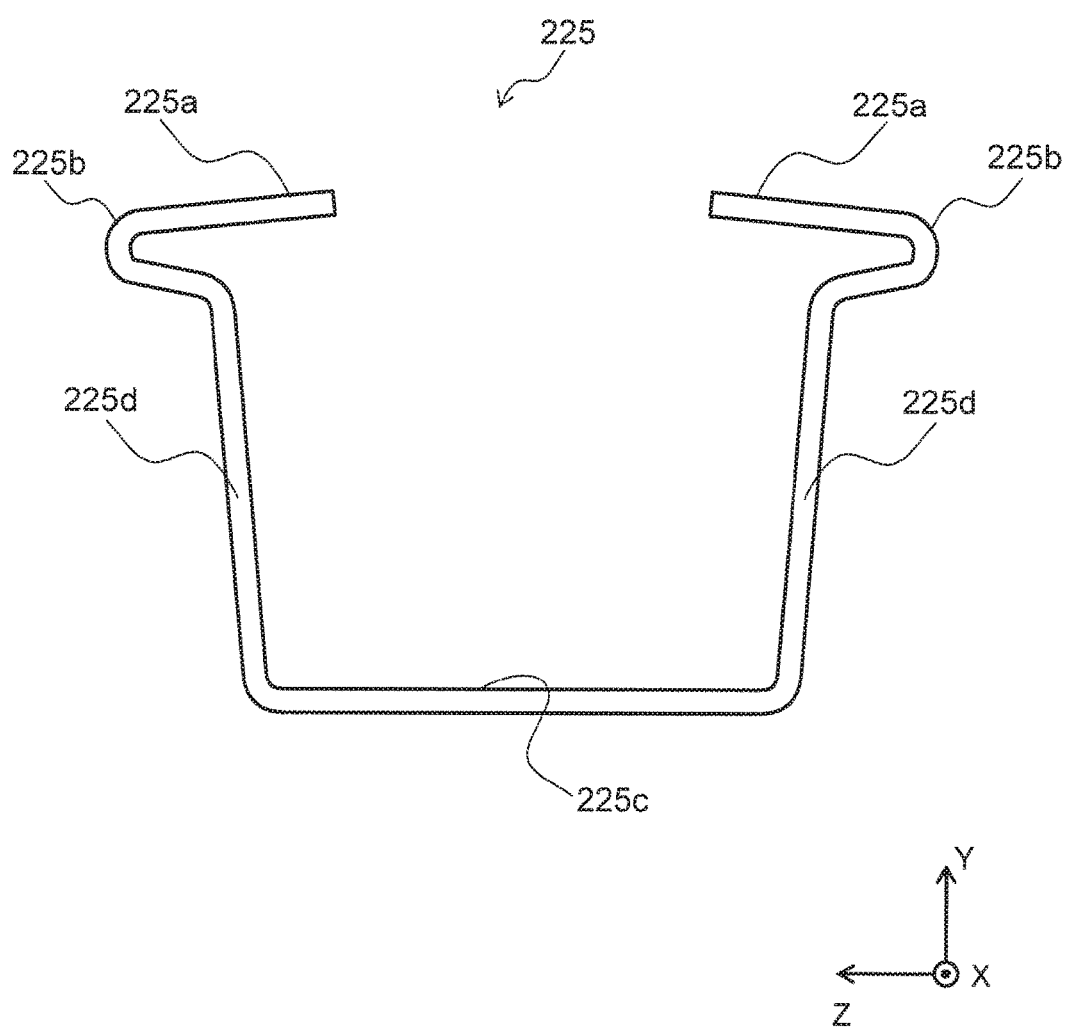
FIG. 5 is a front view schematically illustrating one example of a plate spring according to the first exemplary embodiment.

FIG. 5 is a front view schematically illustrating one example of plate spring 225 according to the first exemplary embodiment.

Plate spring 225 includes a pair of faces 225a, a pair of projection parts 225b, face 225c, and a pair of plates 225d. Projection parts 225b are one example of a projection part that a locker has. Plate spring 225 is made of a metal material having elasticity, for example.

A pair of plates 225d is formed into a substantially rectangular shape, and is disposed to be opposite to each other across face 225c disposed substantially parallel to an XZ plane. One side (side in the negative direction of the Y axis) of one plate 225d (plate 225d in the positive direction of the Z axis) is connected to one side (side in the positive direction of the Z axis) of face 225c. One side (side in the negative direction of the Y axis) of other plate 225d (plate 225d in the negative direction of the Z axis) is connected to the other side (side in the negative direction of the Z axis) of face 225c. One plate 225d tilts in the positive direction of the Z axis such that the other side (the side in the positive direction of the Y axis) opposite to the one side is located further in the positive direction of the Z axis than the one side. Further, other plate 225*d* tilts in the negative direction of the Z axis such that the other side (the side in the positive direction of the Y axis) opposite to the one side is located further in the negative direction of the Z axis than the one side. With this, plate spring 225 has a shape in which its upper part (the part in the positive direction of the Y axis) is wider than face 225*c* as viewed from the X axis direction (see FIGS. 5 and 13).

Projection part 225*b* projecting in the positive direction of the Z axis is formed on the other side of one plate 225*d*, and projection part 225*b* projecting in the negative direction of the Z axis is formed on the other side of other plate 225*d*.

It is supposed that each of projection parts 225*b* is formed into a shape engageable with each of recesses 125*b* formed on handset 100.

A pair of faces 225*a* is disposed at the side (the side in the positive direction of the Y axis) opposite to face 225*c*. One side (the side in the positive direction of the Z axis) of one face 225*a* (face 225*a* in the positive direction of the Z axis) and the other side of one plate 225*d* are connected to each other across projection part 225*b* projecting in the positive direction of the Z axis, and one side (the side in the negative direction of the Z axis) of other face 225*a* (face 225*a* in the negative direction of the Z axis) and the other side of other plate 225*d* are connected to each other across projection part 225*b* projecting in the negative direction of the Z axis.

This structure can be restated such that plate spring 225 has projection part 225*b* formed to project in the positive direction of the Z axis at the boundary between one face 225*a* and one plate 225*d*, and projection part 225*b* formed to project in the negative direction of the Z axis at the boundary between other face 225*a* and other plate 225*d*.

A pair of faces 225*a* is disposed such that the other side (the side in the negative direction of the Z axis) opposite to e one side of one face 225*a* and the other side (the side in the positive direction of the Z axis) opposite to the one side of other face 225*a* are substantially parallel to the X axis, and are opposite to each other across an opening. As described above, the opening is formed between a pair of faces 225*a*. Therefore, when force in the direction of the Z axis is applied, plates 225*d* of plate spring 225 are capable of being flexed in the direction of the force (Z axis direction). When the application of the force is stopped, plates 225*d* are capable of returning to the original position with elastic force that plate spring 225 has.

Each of the pair of faces 225*a* is formed into a shape by which face 225*a* can be stored in hole 220*b* formed on pusher 220.

Notably, projection parts 225*b* may be formed into a rounded shape as illustrated in FIG. 5 showing one example.

Plate spring 225 may be formed by bending a metal plate having elasticity into the above shape.

Plate spring 225 is formed to have a shape and size by which plate spring 225 can be combined to pusher 220. Plate spring 225 is mounted in combination with pusher 220 with the state in which face 225*c* is in contact with face 220*d* of pusher 220, and leading ends of faces 225*a* are inserted into holes 220*b* of pusher 220.

Projection parts 225*b* of plate spring 225 are movable between a seventh position (see FIG. 9) and an eighth position (see FIG. 7B) by the movement (i.e., by the outward movement) of plates 225*d* of plate spring 225 having elasticity toward the direction in which an angle relative to face 225*c* becomes larger than the right angle. In the present exemplary embodiment, the position of projection parts 225*b* where projection parts 225*b* of plate spring 225 are engaged with recesses 125*b* of handset 100 is specified as the "seventh position" (see FIG. 9), and the position of projection parts 225*b* where handset 100 is stored in storage portion 201*a* and projection parts 225*b* are released from the engagement with recesses 125*b* is specified as the "eighth position" (see FIG. 7B). The seventh position is one example of a locking position, and the eighth position is one example of a release position.

When handset 100 is stored in storage portion 201*a* of cradle 200, face 220*a* of pusher 220 is brought into contact with face 125*a* of recess 125 on handset 100, so that pusher 220 is held at the fifth position. In this case, plate spring 225 is stored in base 211 together with pusher 220 (see FIG. 7B).

The inside of base 211 is formed to be slightly larger than pusher 220 in consideration of the thickness of plate spring 225 so as to be capable of storing pusher 220 and plate spring 225. However, when pusher 220 is stored in base 211, the gap between the inner wall of base 211 and faces 220*c* of pusher 220 is narrow (e.g., about 0.5 mm to 1 mm). Therefore, plates 225*d* of plate spring 225 are held as being nipped between faces 220*c* of pusher 220 and the inner wall of base 211 (see FIG. 7B). The position of projection parts 225*b* of plate spring 225 at that time is the eighth position. This state can be restated such that, when pusher 220 is located at the fifth position, projection parts 225*b* of plate spring 225 are held at the eighth position by base 211.

Accordingly, when projection parts 225*b* are located at the seventh position, plate spring 225 is opened more outward than the case where projection parts 225*b* are located at the eighth position, and when projection parts 225*b* are located at the eighth position, plate spring 225 is closed, more inward than the case where projection parts 225*b* are located at the seventh position.

Force in the direction of opening plate spring 225 is exerted on plates 225*d* where projection parts 225*b* are located at the eighth position, with elastic force of plate spring 225. With this, projection parts 225*b* located at the eighth position are biased in the direction toward the seventh position. Therefore, when pusher 220 moves from the fifth position to the sixth position to the outside of base 211, and plate spring 225 is released from base 211 that restricts the movable range of plates 225*d*, projection parts 225*b* move from the eighth position to the seventh position.

Accordingly, when pusher 220 moves from the fifth position to the sixth position, and handset 100 is popped up from storage portion 201*a* of cradle 200, projection parts 225*b* move from the eighth position to the seventh position to be engaged with recess 125 of handset 100. The engagement state is maintained, with elastic force of plate spring 225.

Base 211 is provided with, inside thereof, a stopper (not illustrated) for preventing pusher 211 from being completely removed from base 211 for allowing a part of pusher 220 to be stayed in base 211) when pusher 220 moves to the sixth position. This structure is made to allow pusher 220 to be capable of smoothly returning to the fifth position from the sixth position. Notably, the similar operation may be implemented by adjusting the length of spring 210 or the height of the side wall of base 211.

As described above, locking claw 206 located at the third position is engaged with recess 103 of handset 100 stored in storage portion 201*a* of cradle 200. With this, regarding handset 100 stored in storage portion 201*a*, cradle 200 according to the present exemplary embodiment holds handset 100 in storage portion 201*a*. In addition, regarding handset 100 popped up from storage portion 201*a*, projection parts 225*b* located at the seventh position are engaged with recess 125 of handset 100 popped up from storage portion 201a. Thus, cradle 200 holds handset 100, in this way, cradle 200 according to the present exemplary embodiment prevents falling of handset 100.

When any external force or restriction for the movable range is not imposed on projection parts 225b of plate spring 225 (see FIG. 13), plate spring 225 may further be opened than the case where projection parts 225b are located at the seventh position.

Notably the shapes of the components illustrated in the drawings are only illustrative, and are not limited to the shapes illustrated in the drawings.

[1-2. Operation]

[1-2-1. Handset Removing Operation]

Next, the operation of removing handset 100 from cradle 200 will be described with reference to FIGS. 6A to 13.

FIG. 6A is a plan view schematically illustrating one example of a state in which handset 100 is stored in cradle 200 according to the first exemplary embodiment. FIG. 6B is a sectional view schematically illustrating one example of the state in which handset 100 is stored in cradle 200 according to the first exemplary embodiment. Notably, FIG. 6B is a sectional view taken along line A-A in FIG. 6A.

Figure 7B:
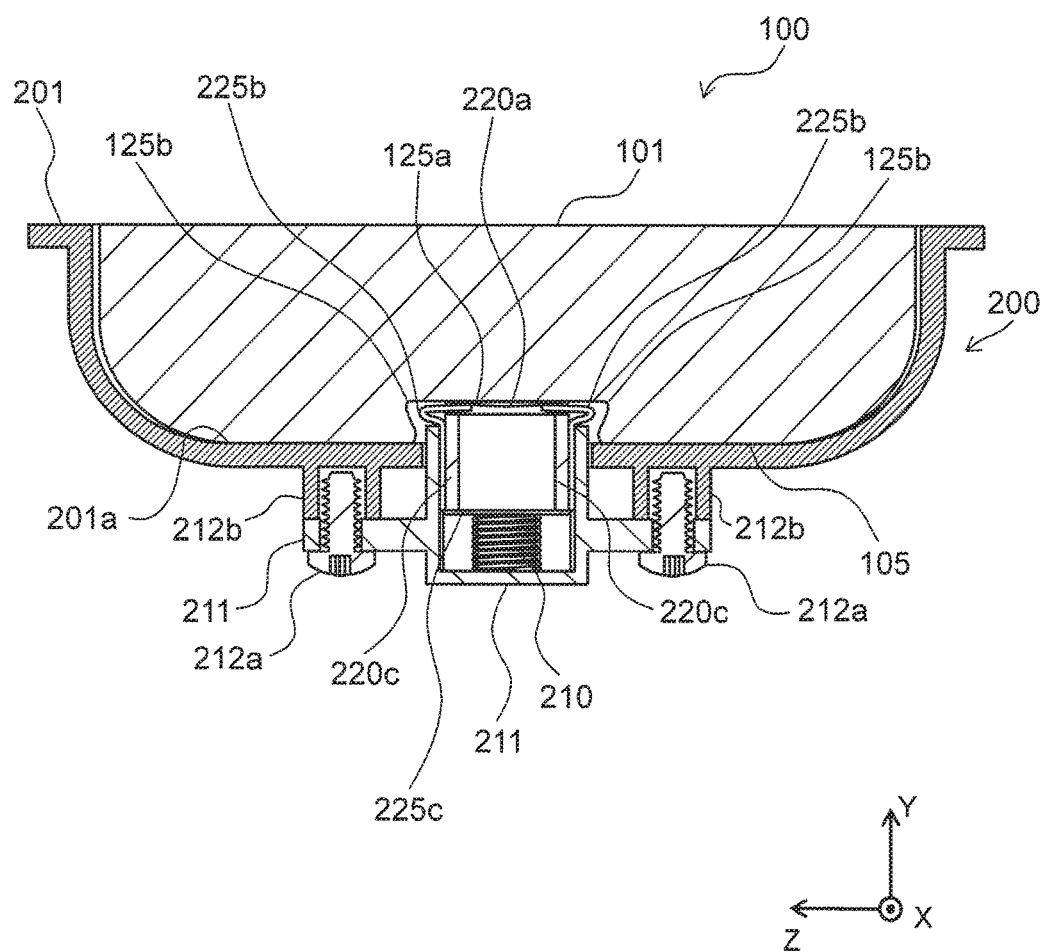
FIG. 7B is a sectional view schematically illustrating one example of a state in which the handset is stored in the cradle according to the first exemplary embodiment.

FIG. 7A is a side view schematically illustrating one example of a state in which handset 100 is stored in cradle 200 according to the first exemplary embodiment. FIG. 7B is a sectional view schematically illustrating one example of a state in which handset 100 is stored in cradle 200 according to the first exemplary embodiment. Notably, FIG. 7B is a sectional view taken along line B-B in FIG. 7A.

Figure 8:
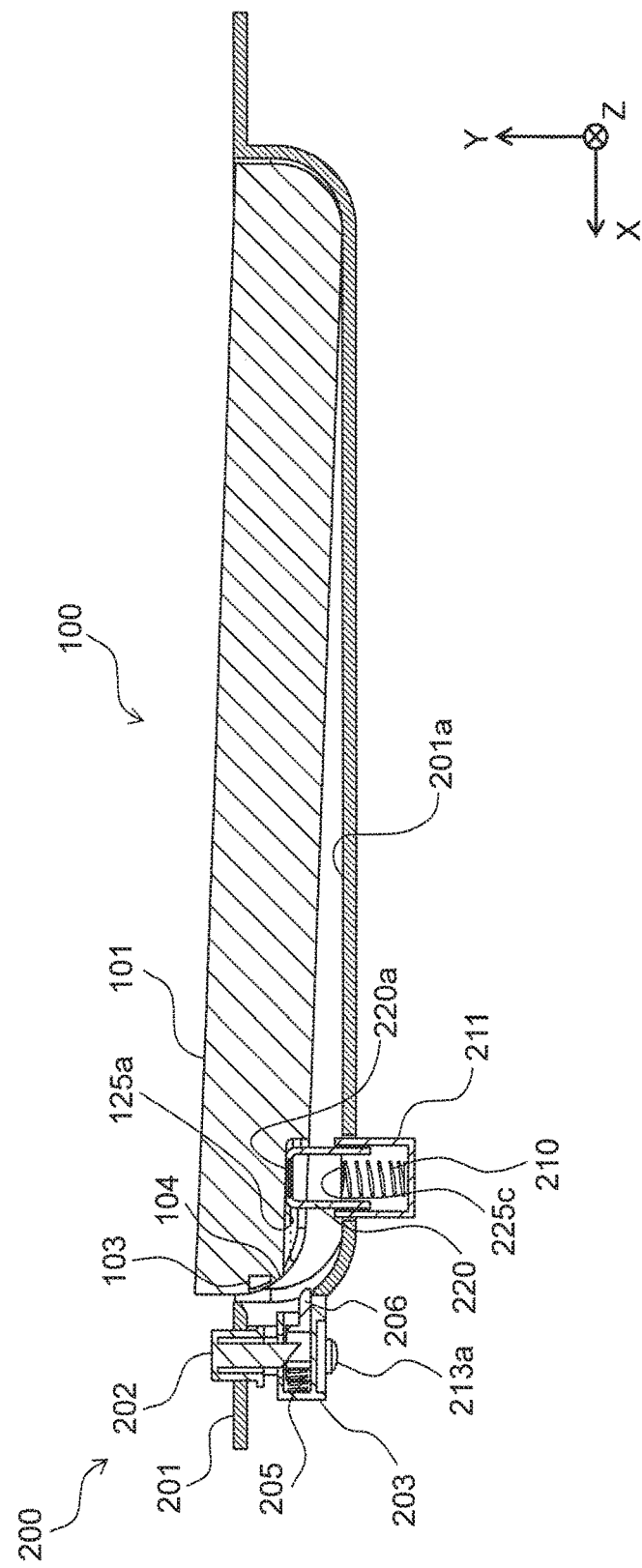
FIG. 8 is a sectional view schematically illustrating one example of a state in which the handset is popped up from the cradle according to the first exemplary embodiment.

FIG. 8 is a sectional view schematically illustrating one example of a state in which handset 100 is popped up from cradle 200 according to the first exemplary embodiment.

FIG. 9 is a sectional view schematically illustrating one example of a state in which handset 100 is popped up from cradle 200 according to the first exemplary embodiment.

Figure 10:
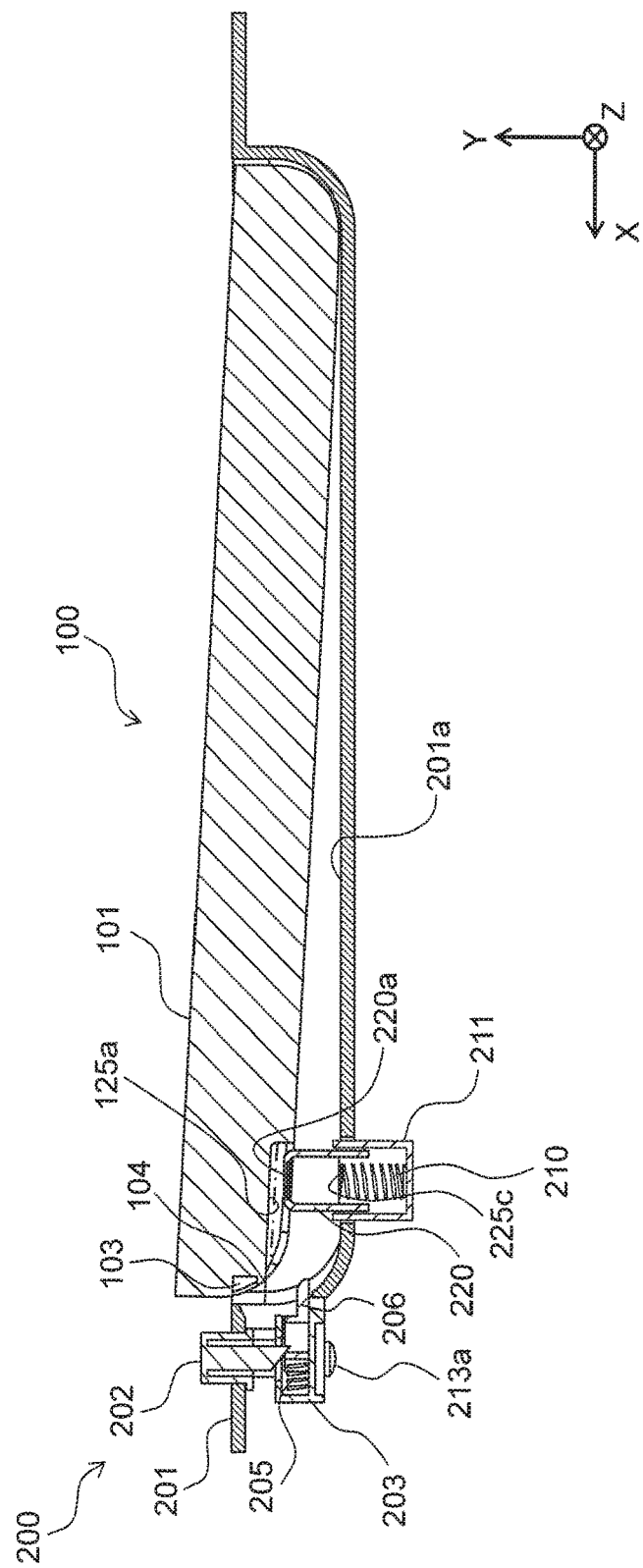
FIG. 10 is a sectional view schematically illustrating one example of a state in which a projection part of the plate spring is located on a boundary between a recess and a bottom surface of the handset according to the first exemplary embodiment.

FIG. 10 is a sectional view schematically illustrating one example of a state in which projection parts 225b of plate spring 225 are located on boundary positions 125c between recess 125 and bottom surface 105 of handset 100 according to the first exemplary embodiment.

Figure 11:
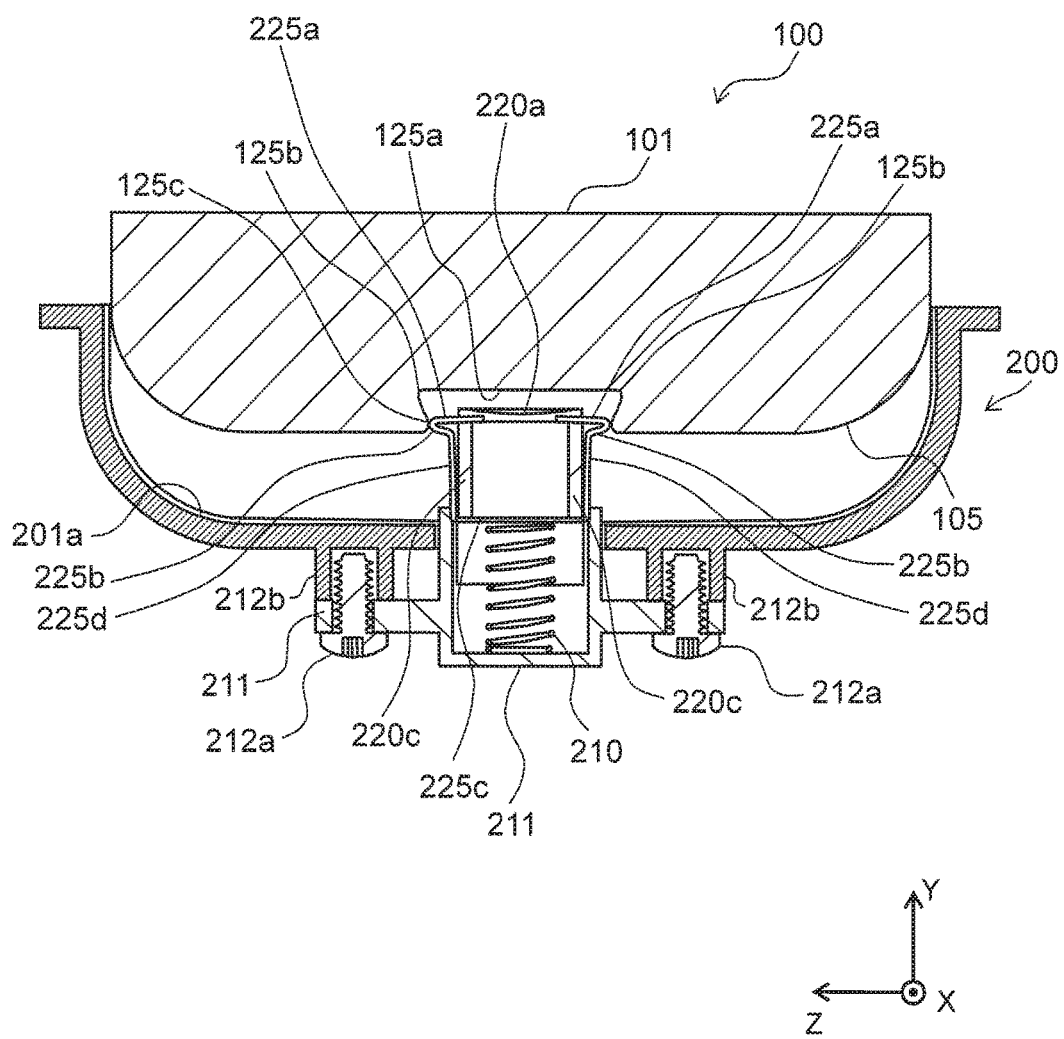
FIG. 11 is a sectional view schematically illustrating one example of a state in which the projection part of the plate spring is located on the boundary between the recess and the bottom surface of the handset according to the first exemplary embodiment.

FIG. 11 is a sectional view schematically illustrating one example of a state in which projection parts 225b of plate spring 225 are located on boundary positions 125c between recess 125 and bottom surface 105 of handset 100 according to the first exemplary embodiment.

Figure 12:
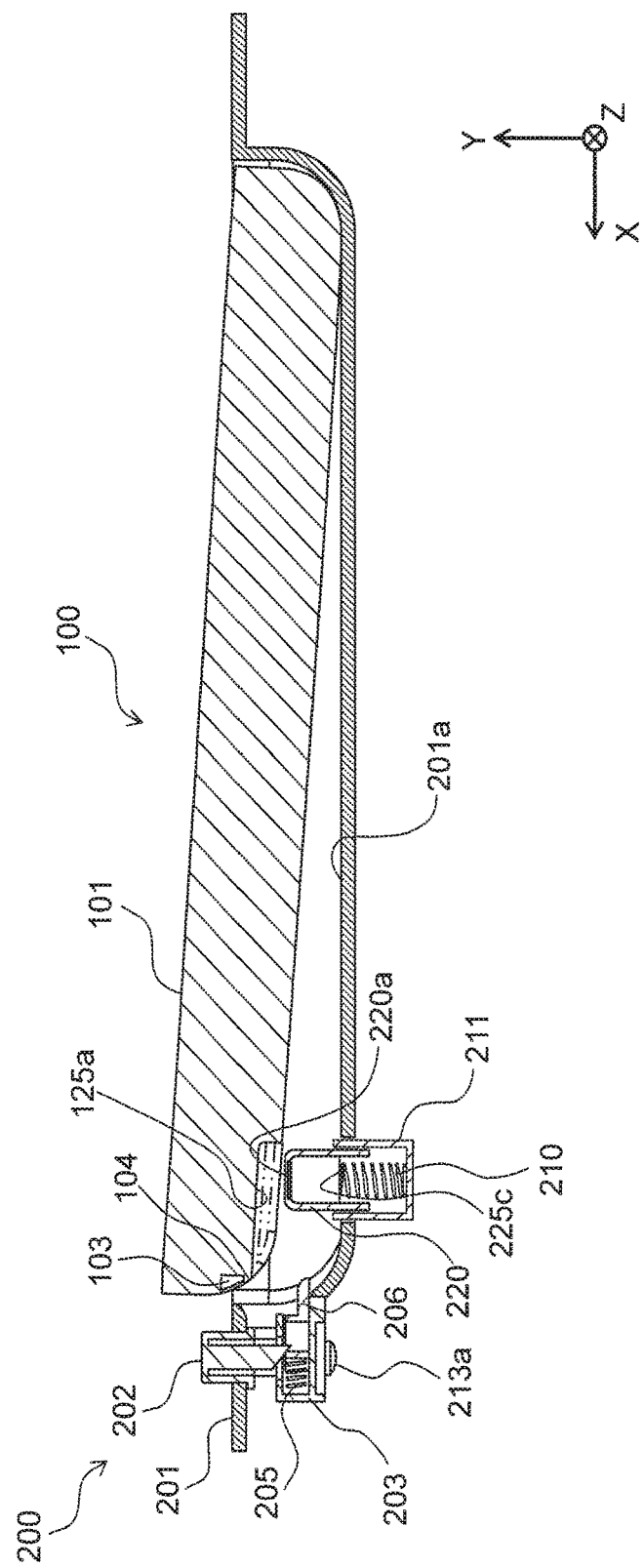
FIG. 12 is a sectional view schematically illustrating one example of a state in which the handset is removed from the cradle according to the first exemplary embodiment.

FIG. 12 is a sectional view schematically illustrating one example of a state in which the handset 100 is removed from cradle 200 according to the first exemplary embodiment.

Figure 13:
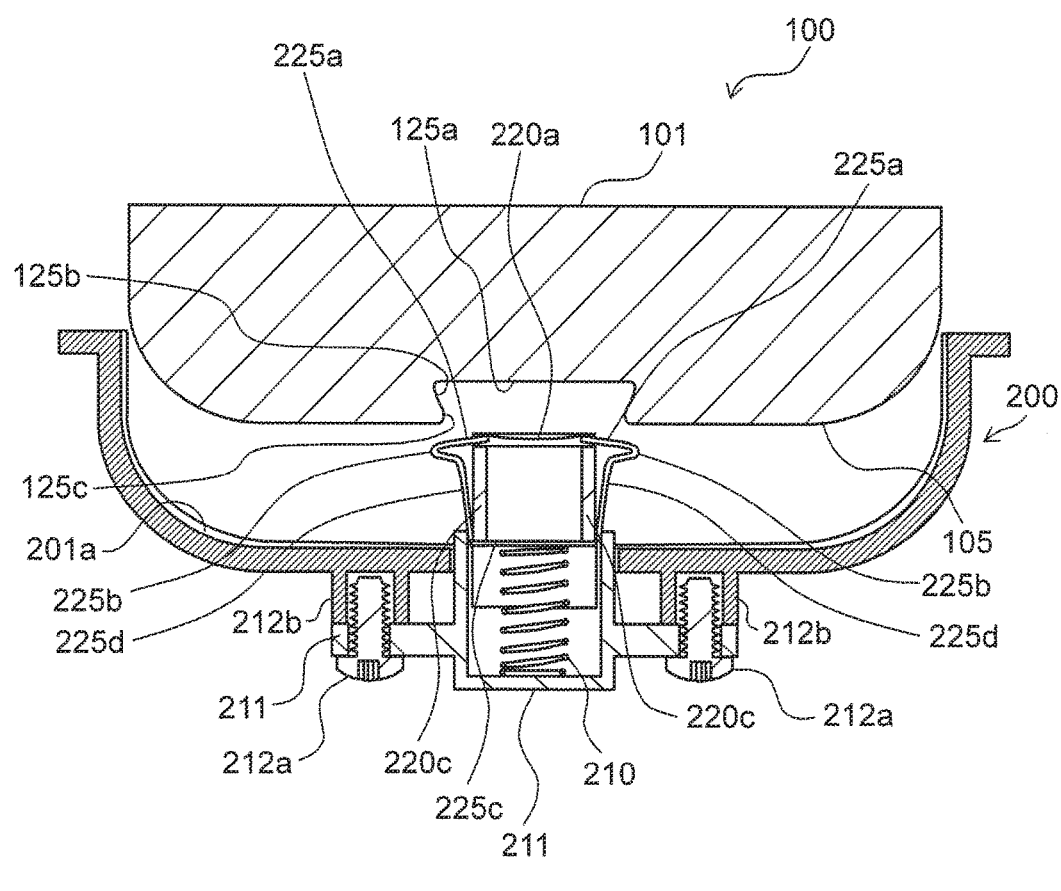
FIG. 13 is a sectional view schematically illustrating one example of a state in which the handset is removed from the cradle according to the first exemplary embodiment.

FIG. 13 is a sectional view schematically illustrating one example of a state in which the handset 100 is removed from the cradle 200 according to the first exemplary embodiment.

Notably, FIGS. 8, 10, and 12 are sectional views taken along line A-A in FIG. 6A. FIGS. 9, 11, and 13 are sectional views taken along line B-B in FIG. 7A. However, FIGS. 6B and 7B to 13 illustrate only an outline as for handset 100.

Firstly, the state in which handset 100 is stored in storage portion 201a of cradle 200 will be described.

As illustrated in FIGS. 6B and 7B, when handset 100 is stored in storage portion 201a of cradle 200, locking claw 206 of cradle 200 is biased in the negative direction of the X axis by spring 205 to be held at the third position, and is engaged with recess 103 of handset 100. Claw 202a of button 202 is pushed up in the positive direction of the Y axis by pressed part 200 of locking claw 206, so that button 202 is held at the first position. Face 220a of pusher 220 is in brought into contact with face 125a of recess 125 on handset 100, so that pusher 220 is held at the fifth position. Plate spring 225 is stored in base 211 together with pusher 220, and plates 225d of plate spring 225 are held as nipped between faces 220c of pusher 220 and the inner wall of base 211. With this, projection parts 225b of plate spring 225 are held at the eighth position. In the present exemplary embodiment, handset 100 is stored in storage portion 201a of cradle 200 with this state, i.e., with the state in which failing of handset 100 from cradle 200 is prevented by locking claw 206. A position of handset 100 when being stored in storage portion 201a of cradle 200 is specified as a "ninth position".

Next, the state in which handset 100 is popped up from storage portion 201a of cradle 200 will be described.

As illustrated in FIGS. 8 and 9, when button 202 of cradle 200 is pushed in the negative direction of the Y axis by the user (not illustrated) to be moved from the first position to the second position, pressed part 200 of locking claw 206 that is in contact with claw 202a of button 202 is pressed by claw 202a moving in the negative direction of the Y axis, and moves in the positive direction of the X axis. With this, locking claw 206 moves from the third position to the fourth position, so that recess 103 of handset 100 is released from the engagement with claw tip 206a of locking claw 206. In this way, handset 100 becomes capable of being popped up from storage portion 201a.

Since handset 100 becomes capable of being popped up, pusher 220 is biased in the positive direction of the Y axis by spring 210 to be moved from the fifth position to the sixth position. Pusher 220 then pushes up face 125a of recess 125 on handset 100 in the positive direction of the Y axis, face 125a being in contact with face 220a of pusher 220. With this, handset 100 is in the state of being pushed up from storage portion 201a of cradle 200. A position of handset 100 in this case is specified as a "tenth position". The tenth position is located in the positive direction of the Y axis from the ninth position. The state in which handset 100 is located on the tenth position is "the state in which handset 100 is popped up". As described above, when the user pushes button 202 from the first position to the second position, handset 100 stored in storage portion 201a of cradle 200 is popped up from the ninth position to the tenth position.

When handset 100 moves from the ninth position to the tenth position to be popped up from storage portion 201a of cradle 200, pusher 220 moves from the fifth position to the sixth position to go outside of base 211 as illustrated in FIG. 9. In this case, plate spring 225 is released from base 211 that restricts the movable range of plates 225d, whereby projection parts 225b move from the eighth position to the seventh position with elastic force of plate spring 225. With this, projection parts 225b of plate spring 225 are engaged with recesses 125b of handset 100, thereby holding handset 100. The engagement state is maintained with elastic force of plate spring 225.

As described above, in the present exemplary embodiment, when handset 100 is popped up from storage portion 201a of cradle 200 to be located at the tenth position, projection parts 225b of plate spring 225 moving to the seventh position with elastic force of plate spring 225 are engaged with recesses 125b of handset 100 to hold handset 100. Therefore, handset 100 is popped up from storage portion 201a of cradle 200 with this state, i.e., with the state in which falling of handset 100 from cradle 200 is prevented by projection parts 225b of plate spring 225.

Next, the state in which handset 100 is removed from cradle 200 will be described.

As illustrated in FIGS. 10 and 11, when the user (not illustrated) picks up handset 100, which is popped up from storage portion 201a of cradle 200, in the positive direction of the Y axis, the inner walls of recesses 125b of handset 100 press projection parts 225b of plate spring 225 toward the center direction of plate spring 225 (i.e., in the direction in which plate spring 225 closes). With this, plates 225d of plate spring 225 move in the direction of closing plate spring 225, and projection parts 225b located at the seventh position move toward the eighth position. Then, projection parts 225b of plate spring 225 move to boundary positions 125c between recess 125 and bottom surface 105 from recesses 125b on handset 100.

In this way, recess 125 on handset 100 is released from the engagement with projection parts 225b of plate spring 225, whereby handset 100 is in the state of being removable from cradle 200. Notably, FIGS. 10 and 11 illustrate the state just after recess 125 on handset 100 is released from the engagement with projection parts 225b of plate spring 225.

When the user further picks up handset 100, handset 100 can be removed from cradle 200 as illustrated in FIGS. 12 and 13. In this case, projection parts 225b of plate spring 225 are released from the engagement with handset 100 in cradle 200, whereby plates 225d of plate spring 225 are biased in the direction of opening plate spring 225 with elastic force of plate spring 225, and hence, projection parts 225b move to the seventh position.

Notably, the position of projection parts 225b illustrated in FIG. 13 may be more outward than the seventh position (i.e., plate spring 225 may further be opened). It is supposed that this position in that case is also included in the seventh position.

[1-2-2. Handset Storing Operation]

Next, the operation at a time when handset 100 is to be stored in storage portion 201a of cradle 200 will be described with reference to FIGS. 6A to 13.

When the user stores handset 100 into cradle 200, the end (the end opposite to the end on the front on which recess 103 is formed, and hereinafter also referred to as backside end) of handset 100 in the negative direction of the X axis is firstly inserted into storage portion 201a of cradle 200, and recesses 109 formed on the back surface of handset 100 are fitted to projections 201b of cradle 200 as illustrated in FIGS. 12 and 13.

Then, when the end (the end on the front surface on which recess 103 is formed) of handset 100 in the positive direction of the X axis is pushed into storage portion 201a of cradle 200 (in the negative direction of the Y axis) by the user, projection parts 225b of plate spring 225 located at the seventh position are brought into contact with boundary positions 125c between recess 125 and bottom surface 105 of handset 100.

When handset 100 is further pushed into storage portion 201a of cradle 200 by the user, projection parts 225b of plate spring 225 are pressed against boundary positions 125c of handset 100 in the negative direction of the Y axis. Boundary positions 125c between recess 125 and bottom surface 105 of handset 100 are formed into a rounded shape, and projection parts 225b are also formed into a rounded shape. Therefore, a part of downward (in the negative direction of the Y axis) force by this pressing acts as force for pressing projection parts 225b in the center direction of plate spring 225 (i.e., in the direction of closing plate spring 225). With this, projection parts 225b of plate spring 225 move in the center direction of plate spring 225, i.e., move from the seventh position toward the eighth position. Notably, FIGS. 10 and 11 illustrate the state just before projection parts 225b of plate spring 225 are engaged with recesses 125b of handset 100.

When handset 100 is further pushed into storage portion 201a of cradle 200 by the user, boundary positions 125c move to the position lower than projection parts 225b, and recess 125 on handset 100 moves to the position of projection parts 225b of plate spring 225. With this, projection parts 225b of plate spring 225 are released from the contact with boundary positions 125c of handset 100, and move to the seventh position with elastic force of plate spring 225. In this way, projection parts 225b of cradle 200 and recesses 125b on handset 100 are engaged with each other as illustrated in FIG. 9.

When handset 100 is further pushed into storage portion 201a of cradle 200 by the user, face 125a of recess 125 on handset 100 and face 220a of pusher 220 are in contact with each other. Face 125a of handset 100 then presses face 220a of pusher 220 in the negative direction of the Y axis to move pusher 220 in the negative direction of the Y axis. In this way, pusher 220 moves to the fifth position from the sixth position.

After pusher 220 moves to the fifth position, plate spring 225 is stored in base 211 together with pusher 220 as illustrated in FIG. 7B. With this, projection parts 225b of plate spring 225 move to the eighth position.

On the other hand, at a time when handset 100 is to be pushed into storage portion 201a of cradle 200 by the user, claw tip 206a of locking claw 206 located at the third position is pressed by face 104 of handset 100 through the contact with face 104 of handset 100, and moves toward the fourth position from the third position. When handset 100 is further pushed into storage portion 201a of cradle 200 by the user, recess 103 on handset 100 moves to claw tip 206a of locking claw 206. Locking claw 206 released from the contact with face 104 of handset 100 is biased by spring 205, and moves in the negative direction of the X axis to the third position. In this way, locking claw 206 of cradle 200 and recess 103 on handset 100 are engaged with each other as illustrated in FIG. 6B.

Thus, handset 100 is in the state of being stored in storage portion 201a of cradle 200 as illustrated in FIGS. 6B and 7B.

It is to be noted that each of upper, lower, left, and right directions and each direction of front, bottom, side, back surfaces, and the like as shown in the present exemplary embodiment are not absolute but relative. In addition, the directions described in each of the above operations are rough, and do not mean strict directions.

[1-3. Effects, and the Like]

As described above, in the present exemplary embodiment, a cradle device is configured to removably store a terminal device provided with a first recess which has a second recess on its inner side face, the second recess being dented in a direction intersecting the removable direction. This cradle device includes a third recess, a pusher, and a locker. The third recess is capable of storing at least a part of the terminal device, the part including the first recess. The pusher is brought into contact with the first recess of the terminal device stored in the third recess, thereby pushing up the terminal device from the third recess. The locker is disposed in combination with the pusher and has a projection part formed to be engageable with the second recess. The locker holds the terminal device in such a manner that the projection part is engaged with the second recess of the terminal device pushed up by the pusher.

In the present exemplary embodiment, a cradle set includes a terminal device provided with a first recess which has a second recess on its inner side face, and a cradle device removably g the terminal device, the second recess being dented in a direction intersecting the removable direction.

This cradle device includes a third recess, a pusher, and a locker. The third recess is capable of storing at least a part of the terminal, device, the part including the first recess. The pusher is brought into contact with the first recess of the terminal device stored in the third recess, thereby pushing up the terminal device from the third recess. The locker is disposed in combination with the pusher and, has a projection part formed to be engageable with the second recess. The locker holds the terminal device in such a manner that the projection part is engaged with the second recess of the terminal device pushed up by the pusher.

The terminal device according to the present exemplary embodiment is the terminal device used in combination with the above cradle device. This terminal device includes a first recess. The first recess includes a face opposite to a bottom surface of the third recess when the terminal device is stored in the third recess of the cradle device, and a second recess dented in a direction intersecting the removable direction of the terminal device relative to the cradle device.

Notably, cradle 200 is one example of the cradle device. Handset 100 is one example of the terminal device. Cradle set 1000 is one example of the cradle set. Recess 125 is one example of a first recess. Recess 125*b* is one example of a second recess. Storage portion 201*a* is one example of a third recess. Pusher 220 is one example of the pusher. Projection part 225*b* is one example of the projection part. Plate spring 225 is one example of the locker.

In the cradle device (e.g., cradle 200) thus configured, the terminal device (e.g., handset 100) stored in the cradle device is held by the locker with the projection part (e.g., projection part 225*b*) of the locker being engaged with the recess (e.g., recess 125*b*) of the terminal device, at a time when being to be popped up from the cradle device. Accordingly, the falling of the terminal device from the cradle device is prevented. Consequently, even when the user removes the terminal device stored in the cradle device as being popped up from the cradle device in order to allow the user to easily remove the terminal device, the terminal device is held by the locker, whereby the falling of the terminal device from the cradle device is prevented. With this, the user can stably remove the terminal device.

While a cradle device according to the conventional art has relatively complicated structure, the cradle device according to the present disclosure can be implemented with relatively a simple structure.

In the cradle device, the pusher may be movable between a storage position where the pusher is in contact with the first recess of the terminal device stored in the third recess and a pushing up position where the terminal device is pushed up from the third recess. The projection part of the locker may be movable between a locking position where the projection part is engaged with the second recess and a release position where the projection part is released from the engagement with the second recess.

The fifth position is one example of the storage position. The sixth position is one example of the pushing up position. The seventh position is one example of the locking position. The eighth position is one example of the release position.

The cradle device may include a pushing spring that biases the pusher from the storage position toward the pushing up position.

Notably, spring 210 is one example of the pushing spring.

In this cradle device, the locker may have elastic force for biasing the projection part toward the locking position from the release position.

This cradle device may include a holder that stores the pusher together with the locker and holds the projection part at the release position, when the pusher is located at the storage position.

Notably, the base 211 is one example of the holder.

The cradle device may have a locking claw that is formed to be engageable with a fourth recess formed on the terminal device, and is engaged with the fourth recess of the terminal device stored in the third recess to hold the terminal device in the third recess. The pusher may push up the terminal device stored in the third recess, when the engagement between the locking claw and the fourth recess is released.

Recess 103 is one example of the fourth recess that the terminal device has. Locking claw 206 is one example of the locking claw.

Other Exempt Any Embodiments

The first exemplary embodiment has been described as an example of technology disclosed in the present application. However, the technology according to the present disclosure is not limited thereto, and is applicable to embodiments to which modifications, replacements, additions, omissions, etc. are made. Furthermore, the components described in the above first exemplary embodiment may be combined to one another to form a new embodiment.

The other exemplary embodiments will be described below.

The first exemplary embodiment describes an example of the exemplary configuration in which a cable is not provided between handset 100 and cradle 200. However, cradle set 1000 may include a cable connecting handset 100 and cradle 200 to each other. For example, a cable connected to cradle 200 may be connected to the backside end of handset 100. Cradle 200 may have a cable storage opening for storing a cable at a position in storage portion 201*a* corresponding to a connection portion between the cable and handset 100 when handset 100 is stored in storage portion 201*a*.

The first exemplary embodiment describes an example of the exemplary configuration in which handset 100 is held by cradle 200 with the engagement between recess 103 on handset 100 and locking claw 206 of cradle 200 and the fitting between recesses 109 formed on the back surface of handset 100 and projections 201*b* of cradle 200, when handset 100 is stored in storage portion 201*a* of cradle 200 and when handset 100 is popped up from storage portion 201*a*. However, cradle 200 may not have projections 201*b*, and handset 100 may not have recesses 109 on the back surface.

For example, in the above-described an example of exemplary configuration in which handset 100 includes a cable connected to cradle 200 and cradle 200 has a cable storage opening in storage portion 201*a*, the cable is stored in the cable storage opening when handset 100 is stored in storage portion 201*a* of cradle 200, by which one end of handset 100 is held by cradle 200. Therefore, the cable stored in the cable storage opening and the connection portion between handset 100 and the cable becomes a substitute of the fitting between recesses 109 formed on the back surface of handset 100 and projections 201*b* of cradle 200. Accordingly, with this configuration, cradle 200 may not have projection 201*b*, and handset 100 may not have recess 109 on the back surface.

The first exemplary embodiment describes an operation example in which, at a time when handset 100 is to be stored in storage portion 201*a* of cradle 200, projection parts 225*b* of plate spring 225 are firstly pressed by boundary positions 125*c* of handset 100 to be temporarily moved from the seventh position toward the eighth position and engaged with recesses 125b of handset 100, and then, face 125a of recess 125 of handset 100 is brought into contact with face 220a of pusher 220 to move pusher 220 in the negative direction of the Y axis. The first exemplary embodiment further describes an operation example in which pusher 220 moves from the sixth position to the fifth position to be stored in base 211, whereby projection parts 225b of plate spring 225 move from the seventh position to the eighth position. However, the present disclosure is not particularly limited to this operation. For example, at a time when handset 100 is to be stored in storage portion 201a of cradle 200, cradle 200 may operate such that projection parts 225b of plate spring 225 are pressed by boundary positions 125c of handset 100, by which pusher 220 starts to move toward the fifth position from the sixth position with projection parts 225b maintained to be located at the seventh position, and is stored in base 211, and with this, projection parts 225b of plate spring 225 move from the seventh position to the eighth position.

The present exemplary embodiment describes the configuration in which plate spring 225 and pusher 220 are combined to each other. However, plate spring 225 and pusher 220 may integrally be formed.

The present exemplary embodiment describes an example of the exemplary configuration in which boundary positions 125c between recess 125 of handset 100 and bottom surface 105 of handset 100 are formed into a rounded shape, and projection parts 225b of plate spring 225 are formed into a rounded shape. However, the present disclosure is not particularly limited thereto. This configuration is made for changing a part of force for pressing, by which boundary positions 125c of handset 100 press projection parts 225b of plate spring 225, into force for moving projection parts 225b toward the eighth position from the seventh position, at a time when handset 100 is to be pushed into storage portion 201a of cradle 200 by the user. Accordingly if this operation can be implemented, boundary positions 125c between recess 125 and bottom surface 105 of handset 100 and projection parts 225b of plate spring 225 may have any shape. For example, the operation similar to the above operation can be implemented with the configuration in which at least one of projection part 225b of plate spring 225 and boundary position 125c of handset 100, which are first brought into contact at a time when handset 100 is to be stored in storage portion 201a of cradle 200, is formed obliquely relative to the Y axis.

Notably, the shapes of the components illustrated in the drawings are only illustrative, and are not limited to the shapes illustrated in the drawings.

The exemplary embodiments described above are to illustrate the technology according to the present disclosure, and various modifications, substitutions, additions, omissions, and the like can be made within the scope of the appended claims or the equivalents thereof.

The present disclosure is applicable to a cradle device that removably holds a terminal device. Specifically the present disclosure is applicable to a cradle device installed in a seat in an aircraft, a rail car, a watercraft, a bus, and the like.

What is claimed is:

1. A cradle device which removably stores a terminal device provided with a first recess having a second recess on an inner side face thereof, the second recess being dented in a direction intersecting a removable direction, the cradle device comprising:
a third recess capable of storing at least a part of the terminal device, the part including the first recess;
a pusher that is in contact with the first recess of the terminal device stored in the third recess to push up the terminal device from the third recess; and
a locker disposed in combination with the pusher and having a projection part formed to be engageable with the second recess,
wherein the locker holds the terminal device in such a manner that the projection part is engaged with the second recess of the terminal device, and the projection part is still engaged with the second recess of the terminal device, in a state in which the terminal device is pushed up by the pusher at a distance away from a bottom of the cradle device, so that the terminal device cannot freely move from the cradle device.

2. The cradle device according to claim 1, wherein
the pusher is movable between a storage position where the pusher in contact with the first recess of the terminal device stored in the third recess and a pushing up position when the terminal device is pushed up from the third recess, and
the projection part of the locker is movable between a locking position where the projection part is engaged with the second recess and a release position where the projection part is released from the engagement with the second recess.

3. The cradle device according to claim 2, comprising:
a pushing spring that biases the pusher toward the pushing up position from the storage position.

4. The cradle device according to claim 2, wherein
the locker has elastic force for biasing the projection part from the release position toward the locking position.

5. The cradle device according to claim 2, comprising:
a holder that stores the pusher together with the locker and holds the projection part at the release position, when the pusher is located at the storage position.

6. The cradle device according to claim 1, further comprising:
a locking claw that is formed to be engageable with a fourth recess formed on the terminal device, and is engaged with the fourth recess of the terminal device stored in the third recess to hold the terminal device in the third recess,
wherein the pusher pushes up the terminal device stored in the third recess when the engagement between the locking claw and the fourth recess is released.

7. A cradle set comprising:
a terminal device provided with a first recess having a second recess on an inner side face thereof, the second recess being dented in a direction intersecting a removable direction; and
a cradle device that removably stores the terminal device, the cradle device comprising:
a third recess capable of storing at least a part of the terminal device, the part including the first recess;
a pusher that is in contact with the first recess of the terminal device stored in the third recess to push up the terminal device from the third recess; and
a locker disposed in combination with the pusher and having a projection part formed to be engageable with the second recess,
wherein the locker holds the terminal device in such a manner that the projection part is engaged with the second recess of the terminal device, and the projection part is still engaged with the second recess of the terminal device, in a state in which the terminal device is pushed up by the pusher at a distance away from a bottom of the cradle device, so that the terminal device cannot freely move from the cradle device.

8. A terminal device used in combination with a cradle device the terminal device comprising:

a first recess having a face opposite to a bottom surface of a third recess of the cradle device when the terminal device is stored in the third recess of the cradle device, and a second recess dented in a direction intersecting a removable direction of the terminal device relative to the cradle device, wherein the cradle device comprises;

a pusher that is in contact with the first recess of the terminal device stored in the third recess to push up the terminal device from the third recess; and a locker disposed in combination with the pusher and having a projection part formed to be engageable with the second recess, the locker holding the terminal device in such a manner that the projection part is engaged with the second recess of the terminal device, and the projection part is still engaged with the second recess of the terminal device, in a state in which the terminal device is pushed up by the pusher at a distance away from a bottom of the cradle device, so that the terminal device cannot freely move from the cradle device.

* * * * *